(12) United States Patent
Krammer et al.

(10) Patent No.: US 10,926,443 B2
(45) Date of Patent: Feb. 23, 2021

(54) INJECTION MOLD HAVING AN IN-MOLD LID CLOSING DEVICE

(71) Applicant: Husky Injection Molding Systems Ltd., Bolton (CA)

(72) Inventors: Christian Krammer, Campinas (BR); Christian Rada, Aalfang (AT)

(73) Assignee: HUSKY INJECTION MOLDING SYSTEMS LTD., Bolton (CA)

( * ) Notice: Subject to any disclaimer, the term of this patent is extended or adjusted under 35 U.S.C. 154(b) by 196 days.

(21) Appl. No.: 15/550,186

(22) PCT Filed: Feb. 18, 2016

(86) PCT No.: PCT/CA2016/050146
§ 371 (c)(1),
(2) Date: Aug. 10, 2017

(87) PCT Pub. No.: WO2016/141461
PCT Pub. Date: Sep. 15, 2016

(65) Prior Publication Data
US 2018/0029269 A1    Feb. 1, 2018

Related U.S. Application Data

(60) Provisional application No. 62/132,132, filed on Mar. 12, 2015.

(51) Int. Cl.
*B29C 45/17*   (2006.01)
*B29C 45/00*   (2006.01)
(Continued)

(52) U.S. Cl.
CPC ........ *B29C 45/1769* (2013.01); *B29C 45/006* (2013.01); *B29C 45/0081* (2013.01);
(Continued)

(58) Field of Classification Search
CPC . B29C 45/1769; B29C 45/0081; B29C 45/40; B29C 45/76; B29C 2945/76505; B29C 2945/76595; B29L 2031/565
See application file for complete search history.

(56) References Cited

U.S. PATENT DOCUMENTS 4,040,595 A    8/1977  Tecco
4,340,352 A    7/1982  Hayberg
(Continued)

FOREIGN PATENT DOCUMENTS

CA    2505287 A1   10/2006
CA    2505962 A1   11/2006
(Continued)

OTHER PUBLICATIONS

PCT International Search Report, Pierre Cuerrier, dated Mar. 15, 2016, 3 pages.
European Search Report; dated Nov. 8, 2018, 7 pages.

*Primary Examiner* — Jacob T Minskey
*Assistant Examiner* — S. Behrooz Ghorishi

(57) ABSTRACT

An injection mold for molding a flip-top closure having a body portion and a lid attached to the body portion by a living hinge has first and second mold portions for defining first and second portions of the flip-top closure respectively, a lid closing tool for closing the lid of the flip-top closure on the body portion after a molding of the flip-top closure in the injection mold and before an ejection of the flip-top closure from the injection mold, and first and second linear actuators operatively connected to the lid closing tool for moving the lid closing tool about first and second axes respectively. The first and second linear actuators are controllable to move the lid closing tool along a lid closing path for closing the lid. An in-mold lid closing device and a method for making a flip-top closure are also disclosed.

10 Claims, 20 Drawing Sheets

(51) Int. Cl.
  *B29C 45/40*  (2006.01)
  *B29L 31/56*  (2006.01)
  *B29C 45/76*  (2006.01)

(52) U.S. Cl.
  CPC .............. *B29C 45/40* (2013.01); *B29C 45/76* (2013.01); *B29C 2045/4084* (2013.01); *B29C 2945/76505* (2013.01); *B29C 2945/76595* (2013.01); *B29L 2031/56* (2013.01); *B29L 2031/565* (2013.01)

(56) References Cited

U.S. PATENT DOCUMENTS

| | | |
|---|---|---|
| 4,351,630 A | 9/1982 | Hayberg et al. |
| 4,818,208 A | 4/1989 | Byrne |
| 7,427,196 B2 | 9/2008 | Kalemba et al. |
| 7,470,387 B2 | 12/2008 | Chiu |
| 2004/0222559 A1* | 11/2004 | Gomes .................. B29C 45/006 264/296 |
| 2008/0260890 A1 | 10/2008 | Di Simone |
| 2016/0001477 A1* | 1/2016 | Okabe .................. B29C 45/0005 264/328.14 |

FOREIGN PATENT DOCUMENTS

| | | | |
|---|---|---|---|
| JP | 61255823 A | * | 11/1986 |
| JP | S61255823 A | | 11/1986 |
| WO | 0228622 A1 | | 4/2002 |
| WO | 2009111854 A1 | | 9/2009 |

* cited by examiner

INJECTION MOLD HAVING AN IN-MOLD LID CLOSING DEVICE

TECHNICAL FIELD

The present technology relates to injection molding systems in general and specifically to an injection mold having an in-mold lid closing device.

BACKGROUND

Molding is a process by virtue of which a molded article can be formed from molding material by using a molding system. Various molded articles can be formed by using the molding process, such as an injection molding process. One example of a molded article that can be formed is a closure for a container, such as a bottle. Several types of closures can be made, depending on the type of the container that the closure is to be used with. Depending on the type of the container the closure is destined to be used with, the closure is designed with specific design considerations in mind. For example, a closure for a carbonated beverage is different in design from a closure for still water (at least in the sealing features used for the closure for the carbonated beverage).

One type of closure known in the art is a flip-top closure having a living hinge. These types of closures are used for sport beverages, sauces containers (such as mayonnaise containers, ketchup containers and specialty sauces containers), as well as shampoo containers, hand cream containers, household cleaning products and the like.

It is further known in the art to produce such flip-top closures having a body portion, a lid and a living hinge therebetween in a mold, which mold has a mechanism used for closing the lid on the body portion after molding of the closure and sufficient cooling thereof. Once the lid is closed on the body portion, the closure is ejected from the mold.

United States Patent Publication No. US 2008/0260890 A1, in the name of Di Simone, published on Oct. 23, 2008 discloses an apparatus and method for holding at least one hinged molded part each having a base portion and a projecting member. This includes at least one part removal mechanism that is located within the at least one mold station, wherein the at least one part removal mechanism each further includes a pivotally attached arm and the at least one part removal mechanism grips both the base portion and the projecting member of the at least one hinged molded part and removes the at least one hinged molded part from a mold half in the at least one mold station and then the pivotally attached arm folds the projecting member towards the base portion of the at least one hinged molded part. The pivotally attached arm can grip and remove the at least one folded part away from the at least one part removal mechanism.

U.S. Pat. No. 4,040,595, granted to Tecco on Aug. 9, 1977 discloses an injection molding machine including a stationary mold half and a movable mold half. The stationary and movable mold halves cooperatively define a mold cavity for injection molding an end closure article having a base and a recloseable tab molded in an open position relative to the base. A thermoplastic material is injected into the mold cavity to form the end closure article. The movable mold half is then separated from the stationary mold half to open the mold cavity, and the tab of the end closure article is closed prior to ejecting the end closure article from the open mold cavity U.S. Pat. No. 4,351,630, granted to Hayberg et al. on Sep. 28, 1982 discloses a device for exercising a living hinge of an article and/or closing a lid of a cap while the article or cap is in a mold for forming the article or cap. The device includes a finger which slides between the mold sections, and, in the process, engages a portion of the article or the lid, rotates the portion or lid about the hinge, and in the case of the cap, snaps the lid shut. In an alternate preferred embodiment, when the finger reaches predetermined point it pivots toward the female mold section to snap the lid tightly shut.

SUMMARY

It is an object of the present technology to ameliorate at least some of the inconveniences present in the prior art. Implementations of the present technology have been developed based on developers' appreciation of at least one shortcoming associated with the prior art solutions and approaches to producing flip-top closures.

According to a broad aspect of the present technology, there is provided an injection mold for molding a flip-top closure. The flip-top closure has a body portion and a lid attached to the body portion by a living hinge. The injection mold has a first mold portion for defining a first portion of the flip-top closure, a second mold portion for defining a second portion of the flip-top closure, a lid closing tool for closing the lid of the flip-top closure on the body portion after a molding of the flip-top closure in the injection mold and before an ejection of the flip-top closure from the injection mold, a first linear actuator operatively connected to the lid closing tool for moving the lid closing tool about a first axis, and a second linear actuator operatively connected to the lid closing tool for moving the lid closing tool about a second axis. The first and second linear actuators are controllable to move the lid closing tool along a lid closing path for closing the lid of the flip-top closure on the body portion. A velocity of the lid closing tool and a force applied by the lid closing tool are controllable and adjustable by controlling the first and second linear actuators.

In at least some implementations of the present technology, the flip-top closure is held onto the second mold portion after the molding of the flip-top closure in the injection mold and before the ejection of the flip-top closure from the injection mold. The first linear actuator is connected to the second mold portion.

In at least some implementations of the present technology, the second linear actuator is connected to the first linear actuator, the second linear actuator is movable about the first axis by the first linear actuator, and the lid closing tool is movable about the first axis together with the second linear actuator.

In at least some implementations of the present technology, the first axis is perpendicular to the second axis.

In at least some implementations of the present technology, the lid closing path comprises at least one curved portion for pivoting the lid relative to the body portion.

In at least some implementations of the present technology, the first and second linear actuators each comprise a servomotor.

In at least some implementations of the present technology, the first and second linear actuators each further comprise a ball screw operatively connected to the servomotor.

In at least some implementations of the present technology, at least one of the first and second mold portions defines a cavity. The lid closing tool is disposed at least in part in the cavity during the molding of the flip-top closure in the injection mold.

In at least some implementations of the present technology, the injection mold molds a plurality of flip-top closures.

The lid closing tool is a plurality of lid closing tools operatively connected to the first and second linear actuators.

In at least some implementations of the present technology, a tool mounting bar is connected to the second linear actuator. The plurality of lid closing tools is mounted to the tool mounting bar.

According to another broad aspect of the present technology, there is provided a method for making a flip-top closure. The flip-top closure has a body portion and a lid attached to the body portion by a living hinge. The method comprises: injecting a molding material in a molding cavity defined between first and second mold portions, the first mold portion defining a first portion of the flip-top closure, the second mold portion defining a second portion of the flip-top closure; moving the first mold portion relative to the second mold portion to open the injection mold, the flip-top closure being held onto the second mold portion; closing the lid of the flip-top closure on the body portion while the flip-top closure is held on the second mold portion by moving a lid closing tool along a lid closing path; controlling and adjusting a velocity of the lid closing tool along the lid closing path and a force applied by the lid closing tool by controlling first and second linear actuators; and ejecting the flip-top closure from the second mold portion. Moving the lid closing tool comprises: actuating a first linear actuator to move the lid closing tool about a first axis; and actuating a second linear actuator to move the lid closing tool about a second axis.

In at least some implementations of the present technology, the first linear actuator is connected to the second mold portion; the second linear actuator is connected to the first linear actuator; and actuating the first linear actuator to move the lid closing tool about the first axis comprises actuating the first linear actuator to move the lid closing tool and the second linear actuator about the first axis.

In at least some implementations of the present technology, the first axis is perpendicular to the second axis.

In at least some implementations of the present technology, closing the lid of the flip-top closure by moving the lid closing tool along the lid closing path comprises moving the lid closing tool in a curve for pivoting the lid relative to the body portion.

In at least some implementations of the present technology, the first and second linear actuators each comprise a servomotor; and controlling the first and second linear actuators comprising controlling the servomotors.

In at least some implementations of the present technology, the first and second linear actuators each further comprise a ball screw operatively connected to the servomotor; and actuating the first and second linear actuators comprises turning the ball screws with the servomotors.

In at least some implementations of the present technology, the method further comprises: disposing the lid closing tool at least in part in a cavity defined by at least one of the first and second mold portions during the injection of the flip-top molding material.

According to another broad aspect of the present technology, there is provided an in-mold lid closing device for closing a lid of a flip-top closure on a body portion of the flip-top closure with the flip-top closure in an injection mold used for molding the flip-top closure. The lid is connected to the body portion by a living hinge. The in-mold lid closing device has a lid closing tool for engaging the lid of the flip-top closure; a first linear actuator operatively connected to the lid closing tool for moving the lid closing tool about a first axis; and a second linear actuator operatively connected to the lid closing tool for moving the lid closing tool about a second axis. The first and second linear actuators are controllable to move the lid closing tool along a lid closing path for closing the lid of the flip-top closure on the body portion. A velocity of the lid closing tool and a force applied by the lid closing tool are controllable and adjustable by controlling the first and second linear actuators.

In at least some implementations of the present technology, the second linear actuator is connected to the first linear actuator; the second linear actuator is movable about the first axis by the first linear actuator; and the lid closing tool is movable about the first axis together with the second linear actuator.

In at least some implementations of the present technology, the first axis is perpendicular to the second axis.

These and other aspects and features of non-limiting implementations will now become apparent to those skilled in the art upon review of the following description of specific non-limiting implementations in conjunction with the accompanying drawings.

DETAILED DESCRIPTION OF THE DRAWINGS

For a better understanding of the present technology, as well as other aspects and further features thereof, reference is made to the following description which is to be used in conjunction with the accompanying drawings, where:

Figure 1:
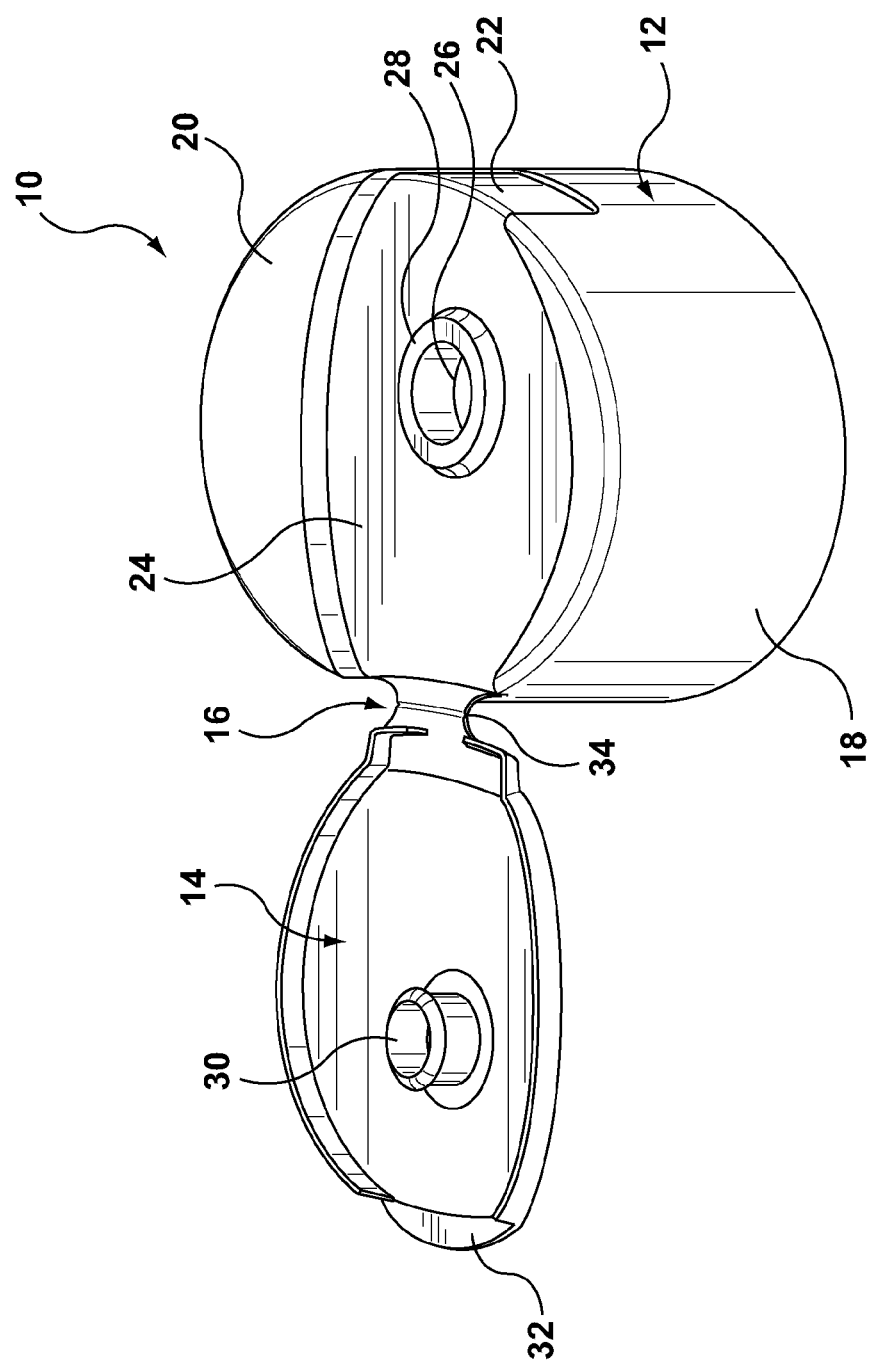
FIG. 1 is a perspective view of an exemplary implementation of a flip-top closure.

The drawings are not necessarily to scale and may be illustrated by phantom lines, diagrammatic representations and fragmentary views. In certain instances, details that are not necessary for an understanding of the implementations or that render other details difficult to perceive may have been omitted.

DETAILED DESCRIPTION OF THE NON-LIMITING IMPLEMENTATIONS

Reference will now be made in detail to various non-limiting implementations for producing a flip-top closure. It should be understood that other non-limiting implementations, modifications and equivalents will be evident to one of ordinary skill in the art in view of the non-limiting implementations disclosed herein and that these variants should be considered to be within scope of the appended claims. Furthermore, it will be recognized by one of ordinary skill in the art that certain structural and operational details of the non-limiting implementations discussed hereafter may be modified or omitted (i.e. non-essential) altogether. In other instances, well known methods, procedures, and components have not been described in detail.

It is to be further expressly understood that the injection mold and its components are depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the injection mold and/or its components may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the injection mold and/or its components may provide in certain instances simple implementations of the present technology, and that where such is the case they have been presented in this manner as an aid to understanding. As persons skilled in the art would understand, various implementations of the present technology may be of a greater complexity. Furthermore, where specific details of the different implementations are presented with reference to discrete implementations, a person skilled in the art is expected to combine specific implementational details of one discrete implementation with specific implementational details of another discrete implementation, even though such a combination may not be expressly disclosed herein below.

FIG. 1 illustrates an exemplary implementation of a flip-top closure 10. The flip-top closure 10 has a body portion 12, a lid 14 and a living hinge 16 attaching the lid 14 to the body portion 12. The flip-top closure 10 is formed by an injection molding process, such as the one described below. In the injection molding process, a molding material is injected in a cavity of an injection mold, such as the injection mold 300 described below, to form the flip-top closure 10. In the present implementation, the molding material is a polymer, such as a thermoplastic or a thermosetting polymer. However it is contemplated that the molding material could be a different type of polymer such as an elastomer, a metal or any other suitable material for injection molding and for the particular application of the flip-top closure 10. In an exemplary implementation, the molding material used for producing the flip-top closure 10 is polypropylene (PP).

As can be seen in FIG. 1, the body portion 12 has a side 18 and a top 20. The side 18 has a generally oval cross-section, but other shapes are contemplated. The side 18 defines a recess 22. The top 20 defines a recess 24, an aperture 26 and a lip 28 surrounding the aperture 26. The recess 22 and the recess 24 are contiguous. It is contemplated that the recess 24 could be omitted. It is also contemplated that the lip 28 could be omitted. The aperture 26 allows the content of the container (not shown) to which the flip-top closure 10 is to be affixed to be poured out of the container. The inner side (not shown) of the body portion 12 defines features complimentary to features of the container to which the flip-top closure 10 is to be affixed permitting the attachment of the flip-top closure 10 to the container. Examples of such features include, but are not limited to, threads, ribs and clips. It is also contemplated that the inner side of the body portion 12 could shaped and sized to provide a press-fitted connection to the container, or welding or bonding of the flip-top closure 10 to the container. It is also contemplated that more than one type of feature could be used. For example, the inner side of the body portion 12 could be threaded and dimensioned to permit bonding.

The lid 14 is shaped to be complementary with the shape of the recess 24 of the body portion 12, such that when the lid is closed, the lid 14 is received in the recess 24. The lid 14 defines cylindrical protrusion 30. The cylindrical protrusion 30 is sized to be received in the aperture 26 when the lid 14 is closed. The cylindrical protrusion 30, the lip 28 and the aperture 26 are configured to prevent the content of the container to which the flip-top closure 10 is to be affixed to flow out of the container when the lid 14 is closed. It is contemplated that the lid 14 could have any other shape permitting the closing of the aperture 26. The lid 14 also defines a tab 32. The tab 32 is aligned with the recess 22 is the side 18 of the body portion 12 when the lid 14 is closed. As a result, a user can open the lid 14 more easily by pushing on the tab 32. It is contemplated that the tab 32 and/or the recess 22 could be omitted.

The living hinge 16 connects the body portion 12 to the lid 14 and has a thinned line 34. The living hinge 16 permits the pivoting of the lid 14 relative to the body portion 12 about an axis defined by the thinned line 34 in order to open and close the lid 14. It is contemplated that living hinges of different types could be used. For example, the living hinge 16 could have multiple parallel thinned lines 34.

The flip-top closure 10 described above is only one contemplated implementation of a flip-top closure, and it should be understood that other implementations of flip-top closures having a body portion and lid attached to the body portion by a living hinge are contemplated. It is also contemplated that the flip-top closure 10 could have more or less features than described above.

With reference to FIGS. 2 to 5, there is depicted a partial cross-sectional view of a portion of an injection mold 100 and a flip-top closure 10'. The injection mold 100 is implemented in accordance with non-limiting implementations of the present technology. The injection mold 100 is for producing the flip-top closure 10'. The flip-top closure 10' comprises a body portion 12', a lid 14' and a living hinge 16' pivotally connecting the body portion 12' to the lid 14'. The flip-top closure 10' has features similar to those of the flip-top closure 10 described above and as such, the flip-top closure 10' will not be described in detail below. The injection mold 100 is depicted in various mold opened configurations, which are maintained during appropriate portions of the molding cycle of the flip-top closure 10' following the injection and cooling of the flip-top closure 10'.

The injection mold 100 is positionable, in use, within an injection molding machine (not depicted). Injection molding machines are well known in the art and, as such, will not be described here at any length. A detailed description of these known injection molding machines may be referenced, at least in part, in the following reference books (for example): (i) "Injection Molding Handbook" authored by OSSWALD/TURNG/GRAMANN (ISBN: 3-446-21669-2), (ii) "Injection Molding Handbook" authored by ROSATO AND ROSATO (ISBN: 0-412-10581-3), (iii) "Injection Molding Systems" 3rd Edition authored by JOHANNABER (ISBN 3-446-17733-7) and/or (iv) "Runner and Gating Design Handbook" authored by BEAUMONT (ISBN 1-446-22672-9). Content of all these reference books is incorporated herein by reference in its entirety in all those jurisdictions where such incorporation by reference is allowed by operation of the law. To the extent that such incorporation by reference is not allowed, the content of these reference books is expected to be within the purview of knowledge of one of ordinary skill in the art.

The injection mold 100 comprises a mold portion 102, a mold portion 104 and an in-mold lid closing device 106. The mold portion 102 defines a portion of the flip-top closure 10' and the mold portion 104 defines another portion of the flip-top closure 10'. The in-mold lid closing device 106 is used to close the lid 14' onto the body portion 12' while the flip-top closure 10' is in the injection mold 100 as will be described below.

The mold portion 102 has a support plate 108 to which are mounted two side support members 110. A mold plate 112 is mounted to the side support members 110. A mold insert 114 is received in a recess in the mold plate 112. A core insert 116 extends through apertures defined in the mold insert 114 and the mold plate 112. The core insert 116 is connected to a core insert plate 118 disposed inside a cavity 120 defined between the support plate 108, the side support members 110 and the mold plate 112. An ejector 122 extends through apertures defined in the mold insert 114 and the mold plate 112 and connects to the core insert plate 118. A stripper ring 124 is disposed around the core insert 116 and extends through the apertures defined in the mold insert 114 and the mold plate 112. The stripper ring 124 is connected to a stripper plate 126. The stripper plate 126 defines apertures through which the core insert 116 and the ejector 122 extend. The stripper plate 126 is disposed in the cavity 120 between the core insert plate 118 and the mold plate 112.

The mold portion 102 has other features and components which are considered not necessary to the understanding of the present technology and which would be known to a person skilled in the art, such as cooling channels for example. Therefore, for simplicity, these other features and components will not be described herein.

The core insert 116 defines the inner side of the body portion 12'. The mold insert 114 and the end of the ejector 122 define an outer portion of the lid 14' and a portion of the living hinge 16'. In some implementations of the present technology, the mold insert 114 can be implemented as a split mold insert. Within these implementations, the mold insert 114 can be made of two or more complementary parts, which can be actuated together and apart during the appropriate portions of the molding cycle. Actuation of the parts of the mold insert 114 can be implemented by known techniques, such as using slides (not depicted) associated with suitable actuators (also not depicted), such as cams, servo motors and the like.

The mold portion 104 has a support plate 140 to which is mounted a mold plate 142. The mold plate 142 defines a cavity 144 sized to receive a portion of the in-mold lid closing device 106 as will be described in greater detail below. In alternative implementation, it is contemplated that the cavity 144 could be defined in the mold plate 112 of the mold portion 102 or that the cavity 144 could be defined by both mold plates 112, 142. Mold inserts 146 and 148 are received recesses in the mold plate 142. A molding material injection system 150 is connected to the support plate 140. The molding material injection system 150 includes a hot runner nozzle 152. The hot runner nozzle 152 extends through apertures defined in the support plate 140, the mold plate 142 and the insert 146. In the depicted embodiment, the hot runner nozzle 152 is implemented as a hot tip hot runner nozzle. In alternative embodiments, the hot runner nozzle 152 can be implemented as a valve-gated hot runner nozzle. It is contemplated that in alternative implementations of the present technology, the hot runner nozzle 152 is replaced by another type of injection nozzle. An ejector 154 extends through apertures defined in the mold insert 148 and the mold plate 142 and connects to an ejector plate 156. The ejector plate 156 is disposed in a recess defined between the mold plate 142 and the support plate 140.

The mold portion 104 has other features and components which are considered not necessary to the understanding of the present technology and which would be known to a person skilled in the art, such as cooling channels for example. Therefore, for simplicity, these other features and components will not be described herein.

The mold insert 146 defines the outer side of the body portion 12'. The mold insert 148 defines an inner portion of the lid 14' and a portion of the living hinge 16'. In some implementations of the present technology, the mold inserts 146, 148 can be implemented as split mold inserts as described above with respect to the mold insert 114. The molding material injection system 150 is used to inject the molding material in the molding cavities when the injection mold 100 is closed (i.e. mold portions 102, 104 abut each other).

Figure 2:
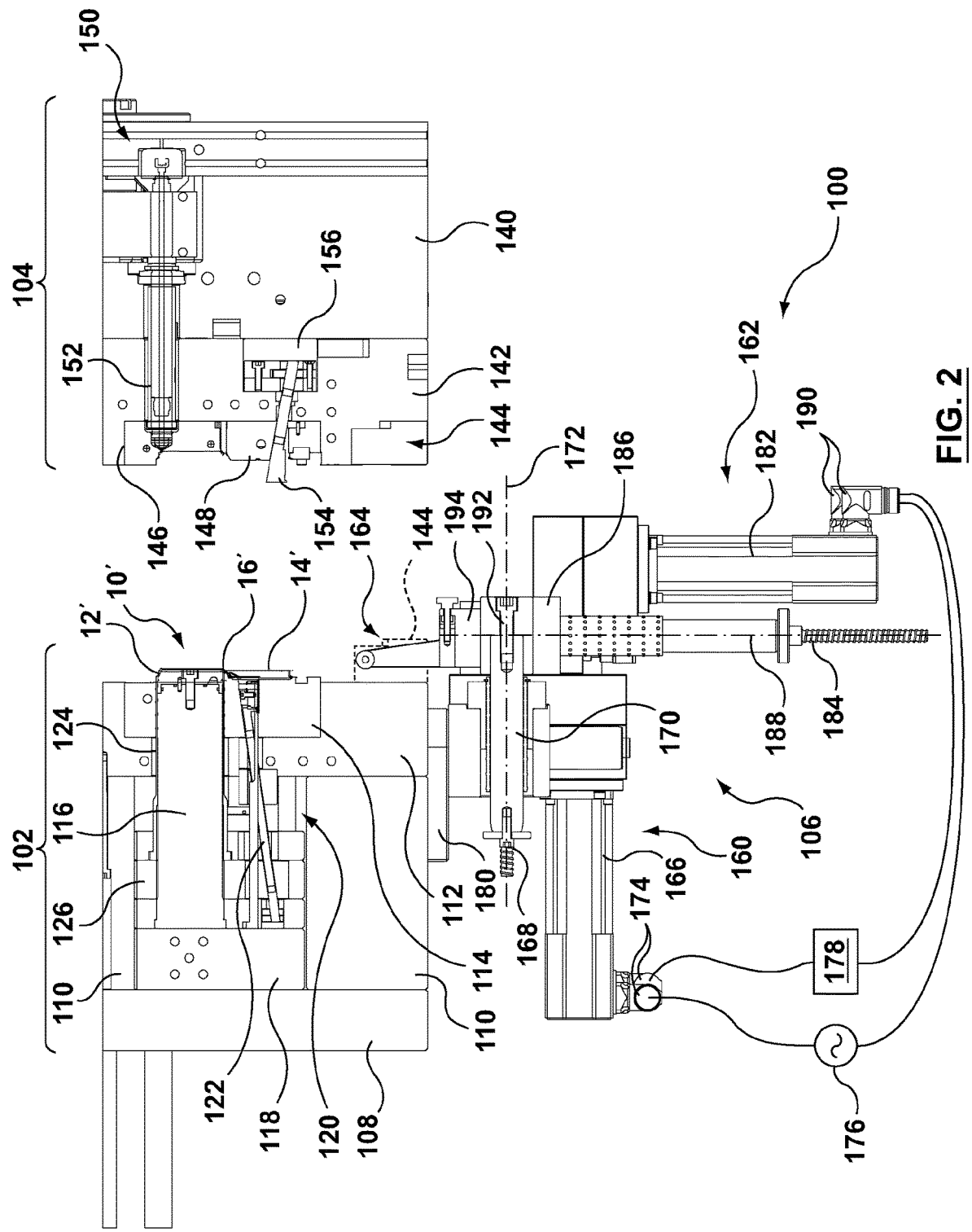
FIG. 2 is partial cross-sectional view of an injection mold and a flip-top closure, with the injection mold being opened following a molding of the flip-top closure.

The in-mold lid closing device 106 has a horizontal linear actuator 160, a vertical linear actuator 162 and a lid closing tool 164. The horizontal linear actuator 160 is an electrical actuator including a servomotor 166, a ball screw 168 and a shaft 170 connected to the ball screw 168. The servomotor 166 is controlled to turn the ball screw 168, which in turn causes the shaft 170 to move about a horizontal axis 172. The servomotor 166 has a pair of angled fittings 174. One of the angled fittings 174 receives the wires connecting the servomotor 166 to a power source 176 (FIG. 2). The other of the angled fittings 174 receives the wires connecting the servomotor 166 to a controller 178 (FIG. 2). The horizontal linear actuator 160 is fastened to the one of the side support members 110 and the mold plate 112 by a connection plate 180. The vertical linear actuator 162 is an electrical actuator including a servomotor 182, a ball screw 184 and a shaft 186 connected to the ball screw 184. The servomotor 182 is controlled to turn the ball screw 184, which in turn causes the shaft 186 to move about a vertical axis 188. The servomotor 182 has a pair of angled fittings 190. One of the angled fittings 190 receives the wires connecting the servomotor 182 to the power source 176. The other of the angled fittings 190 receives the wires connecting the servomotor 182 to the controller 178. The vertical linear actuator 162 is fastened to the shaft 170 of the horizontal linear actuator 160 by a fastener 192. As a result, when the servomotor 166 causes the shaft 170 to move about the horizontal axis 172, the vertical linear actuator 162 also moves about the horizontal axis 172.

It is contemplated that the servomotors 166, 182 could be replaced by electric motors that are not provided with feedback sensors and that separate sensors could be used to sense the positions of the shafts 170, 186 along their respective axes 172, 188. It is also contemplated that the ball screws 168, 184 could be replaced by other mechanisms for converting rotary motion to linear motion, such as, for example, rack and pinion assemblies. It is also contemplated the horizontal linear actuator 160 and the vertical linear actuator 162 could be of a type other than electrical. For example, the horizontal linear actuator 160 and the vertical linear actuator 162 could be pneumatic or hydraulic actuators. It is also contemplated that the linear actuator 160 and the linear actuator 162 could be arranged such that the axis 172 is not horizontal, the axis 188 is not vertical and/or that the axes 172, 188 are not perpendicular to each other. It is also contemplated that the vertical linear actuator 162 could not be connected to the horizontal linear actuator 160. It is also contemplated that instead of being connected to the mold portion 102, the in-mold lid closing device 106 could be connected to the mold portion 104 or to a portion of the injection molding machine.

Figure 6:
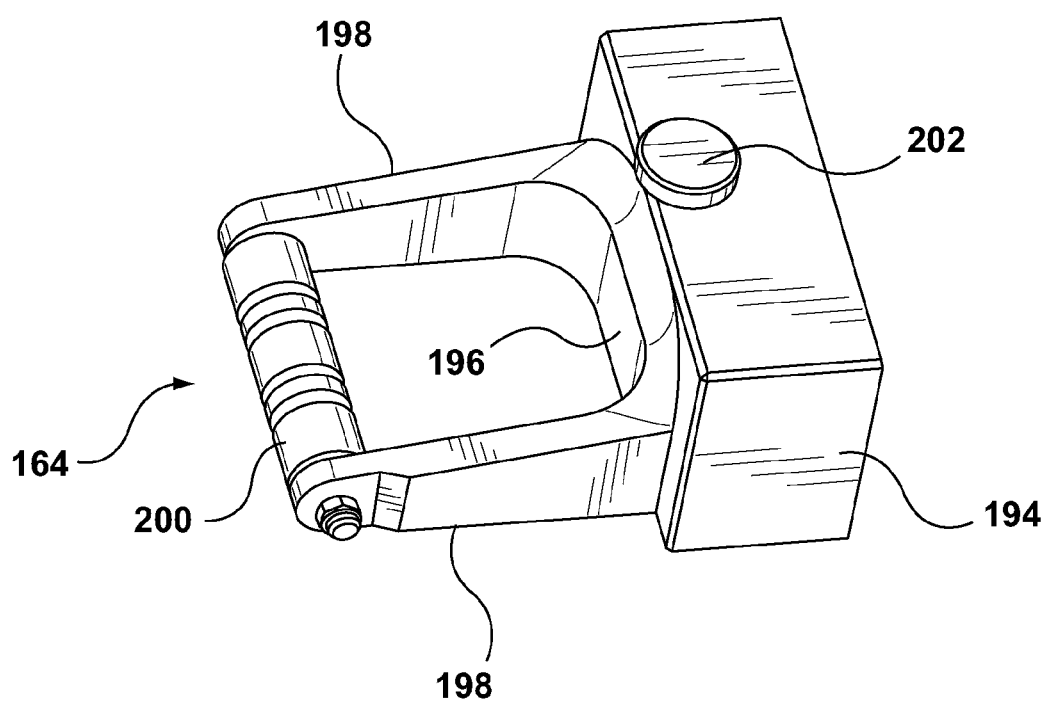
FIG. 6 is a perspective view of a lid closing tool of the injection mold of FIG. 2.

The lid closing tool 164 is connected to the shaft 186 of the vertical linear actuator 162 by a tool mounting bar 194. As can be seen in FIG. 6, the lid closing tool 164 has a base 196 from which two legs 198 extend and a roller 200 disposed between and connected to the legs 198. The roller 200 can rotate relative to the legs 198. It is contemplated that the roller 200 could be replaced by a shaft that is fixed between the legs 198. It is also contemplated that the lid closing tool 164 could have a different configuration. For example, the lid closing tool 164 could be a wedge or an eccentric member. The base 196 is mounted to the tool mounting bar 194 by a fastener 202. By using the tool mounting bar 194 and the fastener 202, the lid closing tool 164 can be easily replaced by another lid closing tool 164 or by another type of lid closing tool suitable for closing the type of flip-top closure being molded in the injection mold 100 should the injection mold 100 be used for molding a flip-top closure other than the flip-top closure 10'.

By being connected to the shaft 186 of the vertical linear actuator 162, the lid closing tool 164 is moved about the horizontal axis 172 and the vertical axis 188 by the horizontal linear actuator 160 and the vertical linear actuator 162. The controller 178 controls the actuation of the servomotors 166, 182 to move the lid closing tool 164 along a lid closing path 204 (shown in dotted lines in FIG. 4) to close the lid 14' of the flip-top closure 10' on the body portion 12' of the flip-top closure 10' as will be described below. The controller 178 also controls the actuation of the servomotors 166, 182 to control and adjust the velocity of the lid closing tool 164 along the lid closing path 204 and to control and adjust the force applied by the lid closing tool 164.

The injection mold 100 as depicted in FIGS. 2 to 5, is shown as a single-cavity injection mold (i.e. an injection mold 100 for producing a single instance of the flip-top closure 10'). As those skilled in the art will appreciate, a typical commercial implementation of the injection mold 100 would include several instances of the cavities (i.e. being of a multi-cavity type). It is expected that those skilled in the art will be able to adapt teachings presented herein in respect to a single-cavity implementation of the injection mold 100 to a multi-cavity implementation of the injection mold 100. For example, in a multi-cavity implementation of the injection mold 100, the injection mold 100 would have a number of lid closing tools 164 corresponding to the number of instances of the flip-top closure 10' being produced. It is contemplated that the number of lid closing tools 164 could be less than the number of instances of the flip-top closure 10' being produced by sizing the lid closing tools 164 to close more than one lid 14' at a time. Also, in a multi-cavity implementation of the injection mold 100, it is contemplated that multiple horizontal linear actuators 160 and multiple vertical linear actuators 162 could be used.

At the beginning of a new molding cycle (i.e. at a beginning of the filling portion of the molding cycle), the injection mold 100 is actuated into the mold closed configuration where the mold portions 102, 104 abut each other to form the molding cavity (not separately numbered) for molding the flip-top closure 10'. The molding cavity is defined between the core insert 116 and the mold inserts 114, 146, 148. In the mold closed configuration, a portion of the lid closing tool 164 is received in the cavity 144 (see FIG. 2 where the position of the cavity 144 in the mold closed configuration is shown in dotted lines). The actuation of the injection mold 100 into the mold closed configuration is generally known in the art and will not be described herein at any length.

Tonnage is then applied by known means (such as a clamp assembly of the injection molding machine that houses, in use, the injection mold 100) to hold the mold portion 102 and the mold portion 104 together to define the molding cavity. As described above, the molding cavity is formed between the core insert 116 and the mold inserts 114, 146 and 148. The tonnage is applied to counteract the pressure of the molding material being injected into the molding cavity through the hot runner nozzle 152. In an exemplary implementation, the molding material used for producing the flip-top closure 10' is polypropylene (PP). However, the choice of material for producing the flip-top closure 10' is considered to be within the purview of a person skilled in the art.

The molding material is injected into the molding cavity to fill the molding cavity. Thereafter, the process of cooling and holding commences. As the flip-top closure 10' cools down, it tends to shrink. A certain amount of molding material can be added to the molding cavity to ensure that the final shape of the flip-top closure 10' is maintained. This process is generally known as packing or holding in the art.

When the flip-top closure 10' has been sufficiently cooled to a temperature that is substantially safe for defect-free ejection, the tonnage is dis-engaged through known techniques, such as disengaging the clamp of the injection molding machine (not shown). During the initial stage of the mold opening, the mold portion 104 is moved away from the mold portion 102 while the mold portion 102 is stationary. As the mold portion 104 is being moved, the ejector 154 is actuated by an actuator (not shown) pushing on the ejector plate 156. Actuating the ejector 154 ensures that the lid 14' is urged off the mold insert 148 and that the flip-top closure 10' is held on the mold portion 102 as can be seen in FIG. 2. The ejector 154 is reset to its molding configuration, where the end of the ejector is substantially flush with mold insert 148 to define a molding surface, before returning the injection mold 100 to its closed configuration to begin a new injection cycle. In an alternative implementation, during the initial stage of the mold opening, it is the mold portion 102 that is moved away from the mold portion 104 while the mold portion 104 is stationary. In another alternative implementation, during the initial stage of the mold opening, both mold portions 102, 104 are moved away each other.

Figure 3:
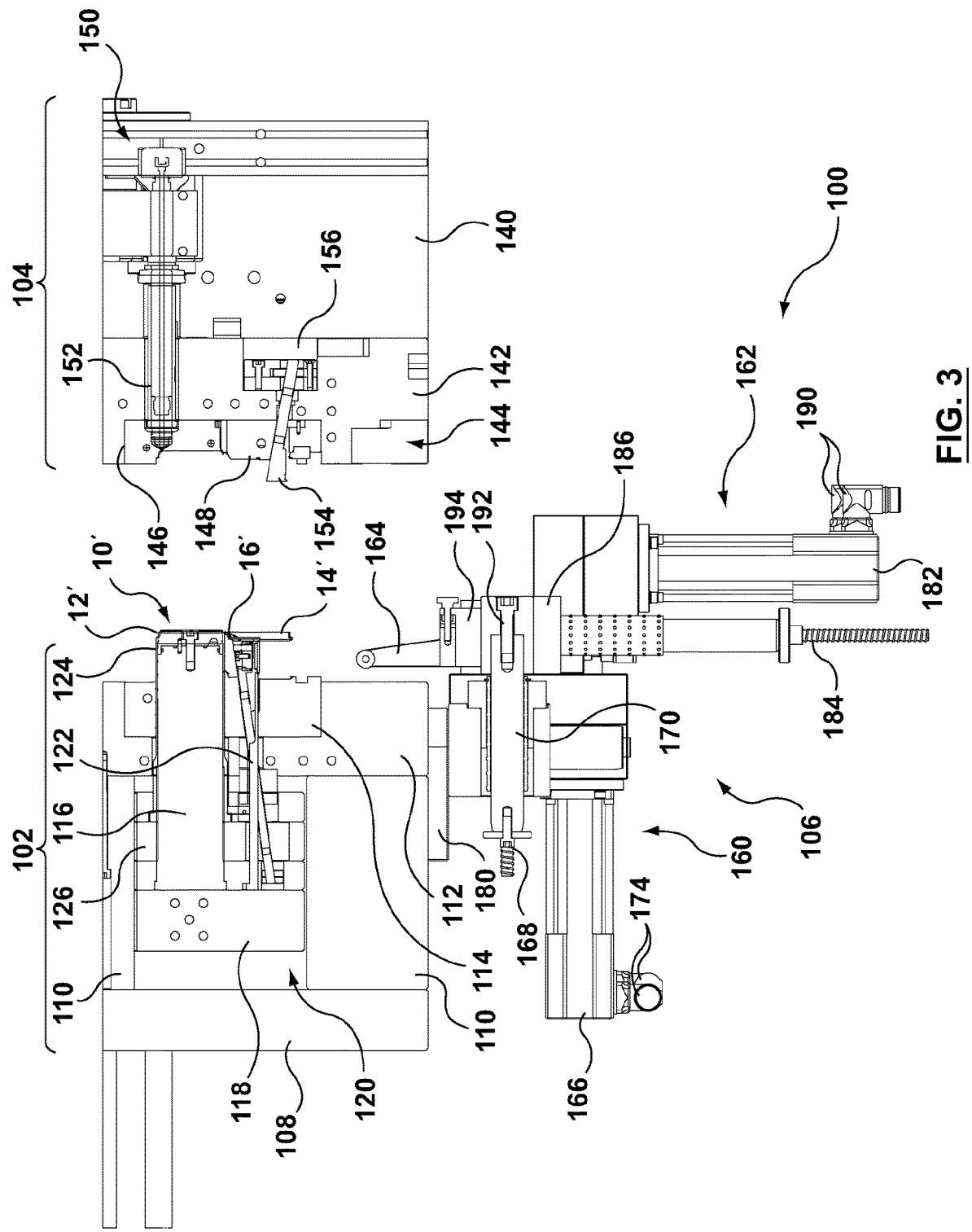
FIG. 3 is partial cross-sectional view of the injection mold and the flip-top closure of FIG. 2, with the flip-top closure being partially lifted from the injection mold following the opening of the injection mold.

Once the injection mold 100 has been opened as shown in FIG. 2, an actuator (not shown) moves the core insert plate 118 toward the right with respect to the orientation of FIGS. 2 to 5. As a result the core insert 116, the ejector 122, the stripper ring 124 and the stripper plate 126 move toward the right with the core insert plate 118. It is contemplated that the stripper plate 126 and the stripper 124 could be moved at the same time and in the same direction as the core insert plate 118 as a result of the actuation of their own, separate actuator (not shown). As a result of the movement of the core insert 116 and of the ejector 122, the flip-top closure 10' is moved to the position shown in FIG. 3, where the lid 14' is lifted off of the mold insert 114 and the body potion 12' is still held on the core insert 116. As can be seen in FIG. 3, a portion of the lid 14' rests on the end of the ejector 122, but a lower portion (with respect to the orientation of the figure) of the lid 14' is not in contact with any surface of the mold portion 102.

Figure 4:
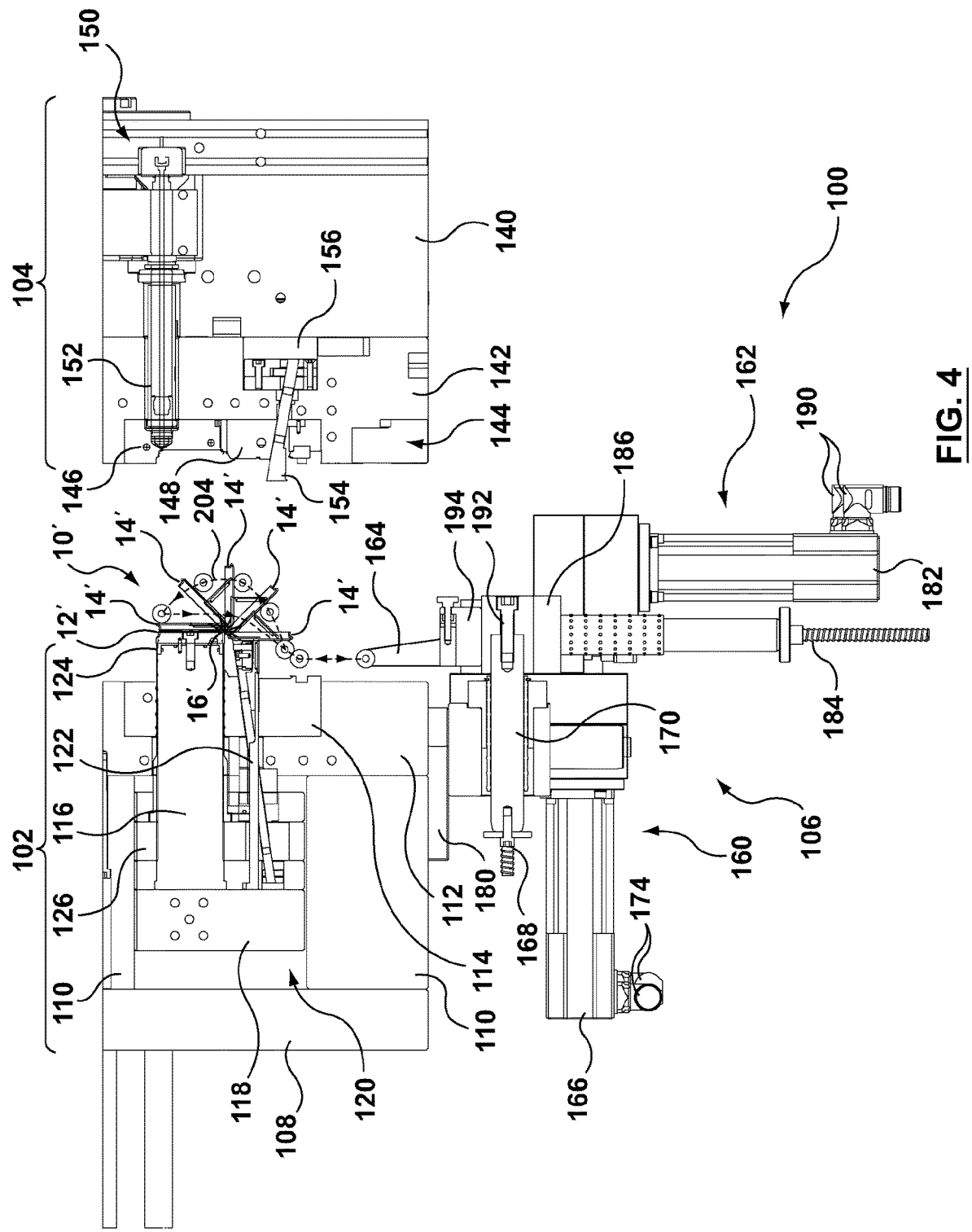
FIG. 4 is partial cross-sectional view of the injection mold and the flip-top closure of FIG. 2, illustrating multiple positions of a lid of the flip-top closure and corresponding positions of a roller of a lid closing device during a lid closing process.

Once the injection mold 100 is in the configuration shown in FIG. 3, the in-mold lid closing device 106 is actuated to move the lid closing tool 164 along the lid closing path 204 shown in FIG. 4. The movement of the lid closing tool 164 will be described below with respect to the orientation of FIG. 4. It should be understood that the directions and relative spatial position of the components provided would differ should the elements of the figure be oriented differently. As would be understood from the shape of the lid closing path 204, the vertical linear actuator 162 is first actuated by the controller 178 to move the lid closing tool 164 up about the vertical axis 188 toward the core insert 116. As the vertical linear actuator 162 continues to move the lid closing tool 164 up, the controller 178 then actuates the horizontal linear actuator 160 to move the lid closing tool 164 toward the right such that the roller 200 of the lid closing tool 164 comes into contact with the lower left surface of the lid 14' and that the roller 200 is disposed between the lid 14' and the mold insert 112. The controller 178 then continues to actuate the linear actuators 160, 162 to move the lid closing tool 164 up and to the right about both axes 172, 188 along a curved portion of the lid closing path 204, thereby pivoting the lid 14' toward the body portion 12' of the flip-top closure 10'. Once the lid 14' is horizontal, the controller 178 actuates the linear actuators 160, 162 to move the lid closing tool 164 up and to the left along a curved portion of the lid closing path 204, thereby pivoting the lid 14' toward the body portion 12' of the flip-top closure 10' until the lid 14' is closed. Once the lid 14' is closed, the controller 178 actuates the vertical linear actuator 162 to move the lid closing tool 164 down. As the lid closing tool 164 moves down, the roller 200 rolls over the surface of the lid 14'. It is contemplated that as the roller 200 rolls over the surface of the lid 14', the controller 178 could actuate the horizontal linear actuator 160 such that the roller 200 applies a force toward the left on the lid 14' to ensure that the lid 14 is properly closed. Once the lid closing tool 164 has cleared the flip-top closure 10', the controller 178 actuates the linear actuators 160, 162 to first move the lid closing tool 164 down and left along a curved portion of the lid closing path 204 and then only down about the axis 188 until the lid closing tool 164 is returned to its initial position.

In one implementation, the controller 178 controls the actuation of the linear actuators 160, 162 such that the speed of the lid closing tool 164 varies along the lid closing path 204. For example, the lid closing tool 164 could be moved faster by the linear actuators 160, 162 when the lid closing tool 164 is not in contact with the lid 14' then when the lid closing tool 164 is in contact with the lid 14'. In another implementation, the controller 178 controls the actuation of the linear actuators 160, 162 such that the speed of the lid closing tool 164 remains constant along the lid closing path 204. In one implementation, the controller 178 controls the actuation of the linear actuators 160, 162 such that the force applied by the lid closing tool 164 varies along the lid closing path 204. For example, the lid closing tool 164 could be controlled by the linear actuators 160, 162 to apply more force when the lid closing tool 164 is about to close the lid 14' onto the body portion 12' and to then apply less force once the lid 14' is closed. In another implementation, the controller 178 controls the actuation of the linear actuators 160, 162 such that the force applied by the lid closing tool 164 remains constant along the lid closing path 204. It is contemplated that the lid closing path 204 could differ from the one illustrated. Two factors which determine the shape of the lid closing path 204 include, but are not limited to, the geometry of the flip-top closure 10' and the geometry of the lid closing tool 164. Therefore, the use of the horizontal linear actuator 160 and vertical linear actuator 162 to move the lid closing tool 164 about the axes 172, 188 to close the lid 14' on the body portion 12' while the flip-top closure 10' is held on the mold portion 102 allows the shape of the lid closing path 204 to be changed, allows for the control and adjustment of the velocity (i.e. speed and direction) of the lid closing tool 164 and allows for the control and adjustment of the force applied by the lid closing tool 164.

Figure 5:
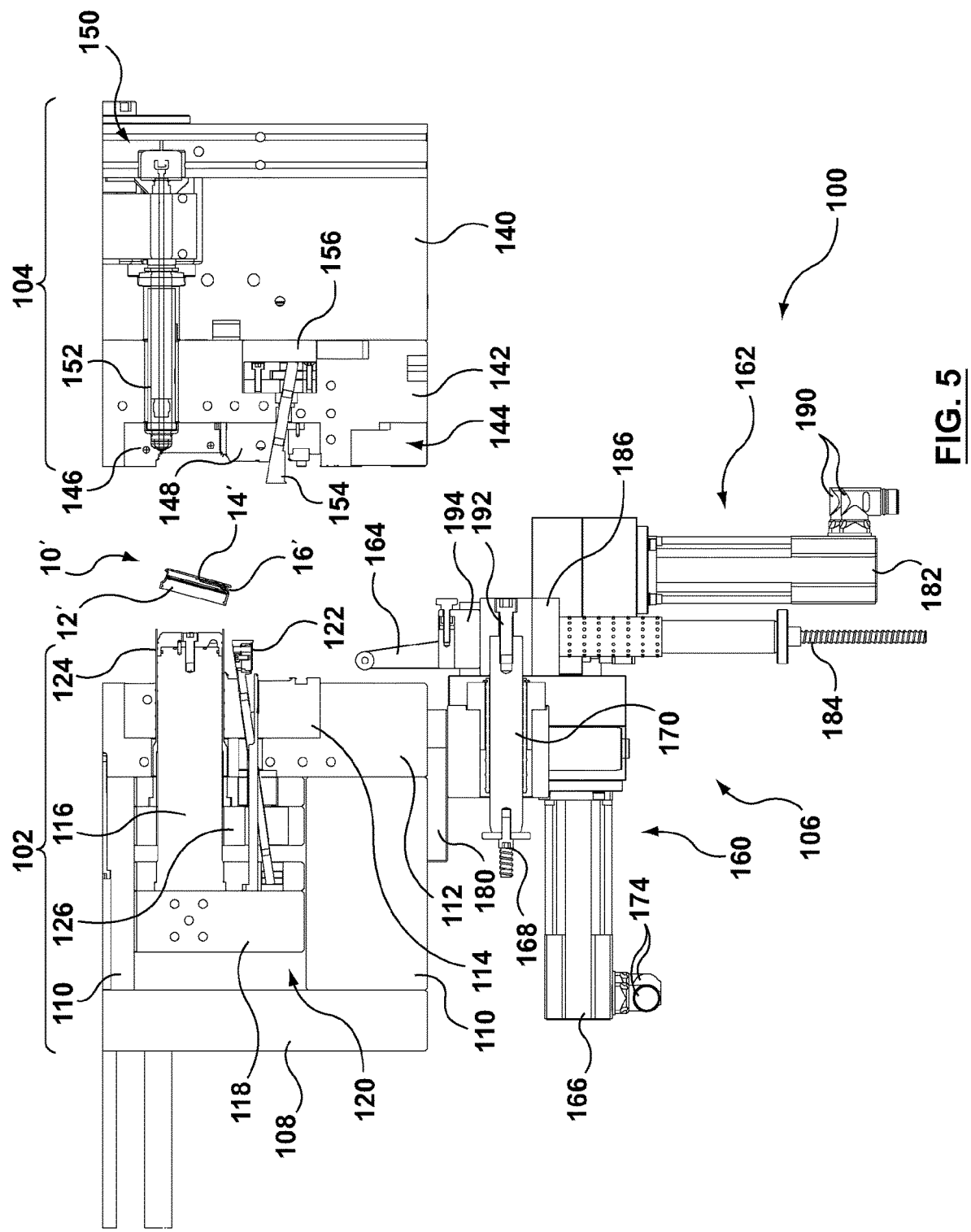
FIG. 5 is partial cross-sectional view of the injection mold and the flip-top closure of FIG. 2, with the flip-top closure being ejected from the injection mold following the closing of the lid.

Once the lid 14' is closed and the lid closing tool 164 has been returned to its initial position, the flip-top closure 10' is ejected from the mold portion 102. With reference to FIG. 5, to eject the flip-top closure 10', the stripper plate 126 is moved toward the right (with respect to the orientation of the figure) by an actuator (not shown) while the core insert 116 remains stationary. As a result, the stripper ring 124 moves toward the right (with respect to the orientation of the figure) relative to the core insert 116 and extends beyond the core insert 116, which pushes the flip-top closure 10' off of the core insert 116. As in the present implementation the mold portions 102, 104 separate about a vertical plane, the ejected flip-top closure 10' falls out of the injection mold 100 by gravity. Once the flip-top closure 10' has been ejected from the injection mold 100, the mold portion 102 is returned to its configuration shown in FIG. 2 and the injection mold 100 is closed in order to begin another injection cycle.

It is contemplated that the mold portions 102, 104 could be oriented so as to separate about a horizontal plane. As would be understood, in such an implementation the linear actuator 160 would be the vertical linear actuator and the linear actuator 162 would be in the horizontal linear actuator. In such an implementation, the flip-top closure 10' remains in the injection mold 100 after it has been ejected. In order to remove the flip-top closure 10' from the injection mold 100, a part removal apparatus is provided to push the ejected flip-top closure 10' out of the injection mold 100. In alternative embodiments of the present technology, a separate part removal apparatus (not depicted) can be used for removing the flip-top closure 10' from the injection mold 100. Implementation of such part removal apparatus is known to those of skill in the art and, as such, will not be discussed here at any length. It is contemplated that the mold portions 102, 104 could be oriented so as to separate about a plane oriented at any angle, and that depending on the angle of this plane, a part removal apparatus for pushing the flip-top closure 10' out of the injection mold 100 may or may not be necessary.

Turning now to FIGS. 7 to 20, there is depicted a portion of an injection mold 300 and four flip-top closures 10 of the type described above with respect to FIG. 1. The injection mold 300 is implemented in accordance with non-limiting implementations of the present technology. The injection mold 300 is for producing four flip-top closures 10 per injection cycle. It is contemplated that the injection mold 300 could be modified for producing more or less than four flip closures per injection cycle. The injection mold 300 is depicted a mold opened configuration during various steps of the lid closing operation of the molding cycle of the flip-top closures 10 following the injection and cooling of the flip-top closures 10. For clarity, some portions of the injection mold 300 have been omitted from FIGS. 7 to 20, however it should be understood that such portions of the injection mold 300 nonetheless form part of the injection mold 300. The omitted portions of the injection mold 300 are similar to those of the injection mold 100, but adapted for producing four flip-top closures 10 per injection cycle as would be known to a person skilled in the art. The injection mold 300 is positionable, in use, within an injection molding machine (not depicted).

The injection mold 300 comprises a mold portion 302, another mold portion (not shown) and an in-mold lid closing device 306. The mold portion 302 defines a portion of the flip-top closures 10 and the other mold portion defines another portion of the flip-top closures 10. The in-mold lid closing device 306 is used to close the lids 14 onto the body portions 12 while the flip-top closures 10 are in the injection mold 300 as will be described below.

The mold portion 302 has a support plate (not shown) to which are mounted two side support members (not shown) in a manner similar as in the mold portion 102 described above. A mold plate 312 is mounted to the side support members. A mold insert 314 is received in a recess in the mold plate 312. Four mold inserts 315 are connected to the mold insert 314. Four core inserts 316 extend through apertures defined in the mold insert 314 and the mold plate 312. The core inserts 316 are connected to a core insert plate (not shown) disposed inside a cavity (not shown) defined between the support plate, the side support members and the mold plate 312. Four stripper rings 324 are disposed around the core inserts 316 and extend through the apertures defined in the mold insert 314 and the mold plate 312. The stripper rings 324 are connected to a stripper plate 326. The stripper plate 326 defines apertures through which the core inserts 316 extend. The stripper plate 326 is disposed between the core insert plate and the mold plate 312.

The mold portion 302 has other features and components which are considered not necessary to the understanding of the present technology and which would be known to a person skilled in the art, such as cooling channels for example. Therefore, for simplicity, these other features and components will not be described herein.

The core inserts 316 defines the inner sides of the body portions 12. The mold insert 314 define a portion of the outer portions of the body portions 12. The mold inserts 325 define the outer portions of the lids 14 and a portion of the living hinges 16.

The other mold portion which has been omitted from the figures has plates, mold inserts, ejectors, molding material injection systems and other components. In one implementation, the other mold portion is similar to the mold portion 104, but adapted to produce four flip-top closures 10 per injection cycle. The mold inserts of the other mold portion define the outer portions of the body portions 12, the inner portions of the lids 14 and portion of the living hinges 16.

Figure 8:
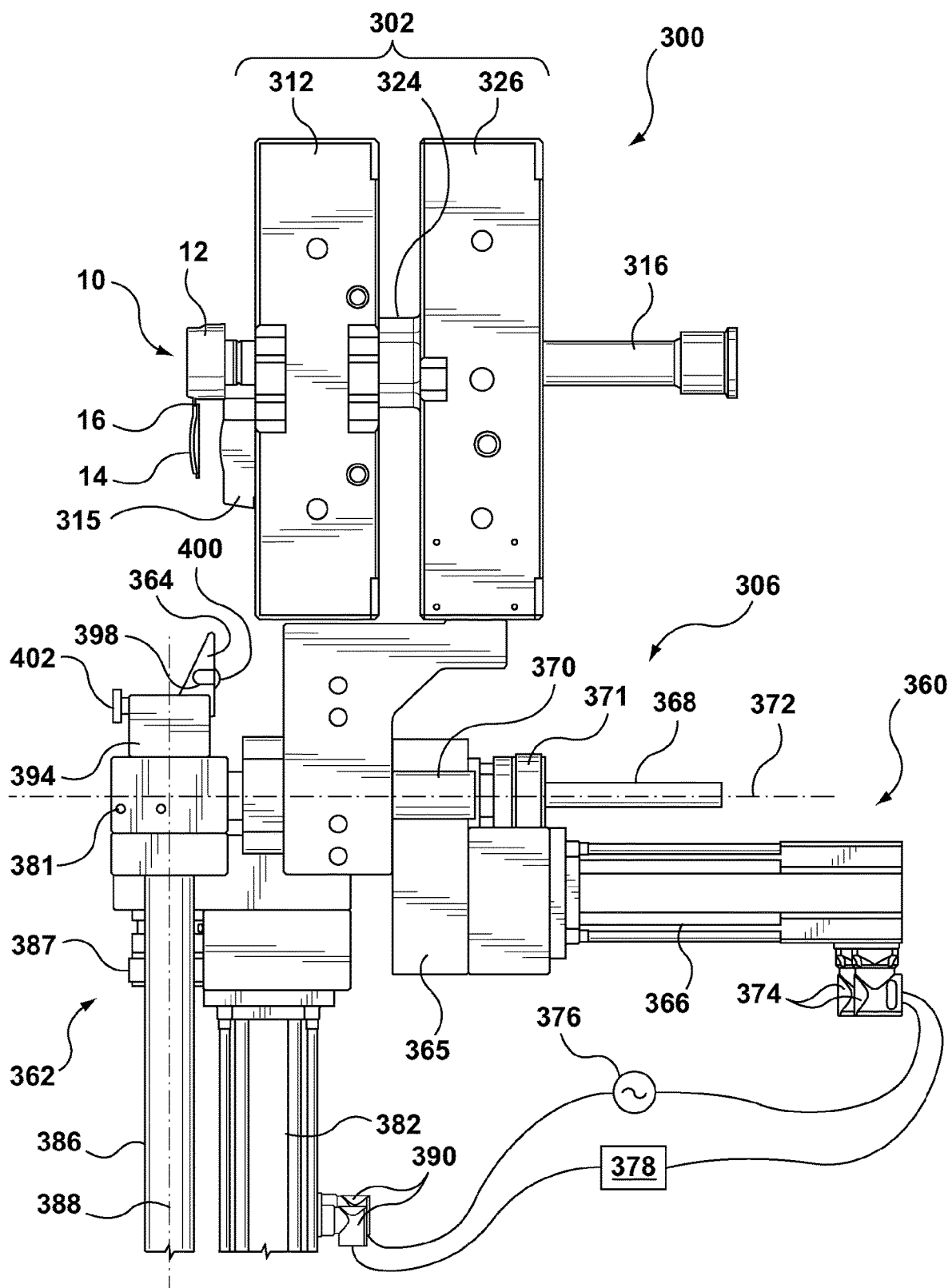
Figure 9:
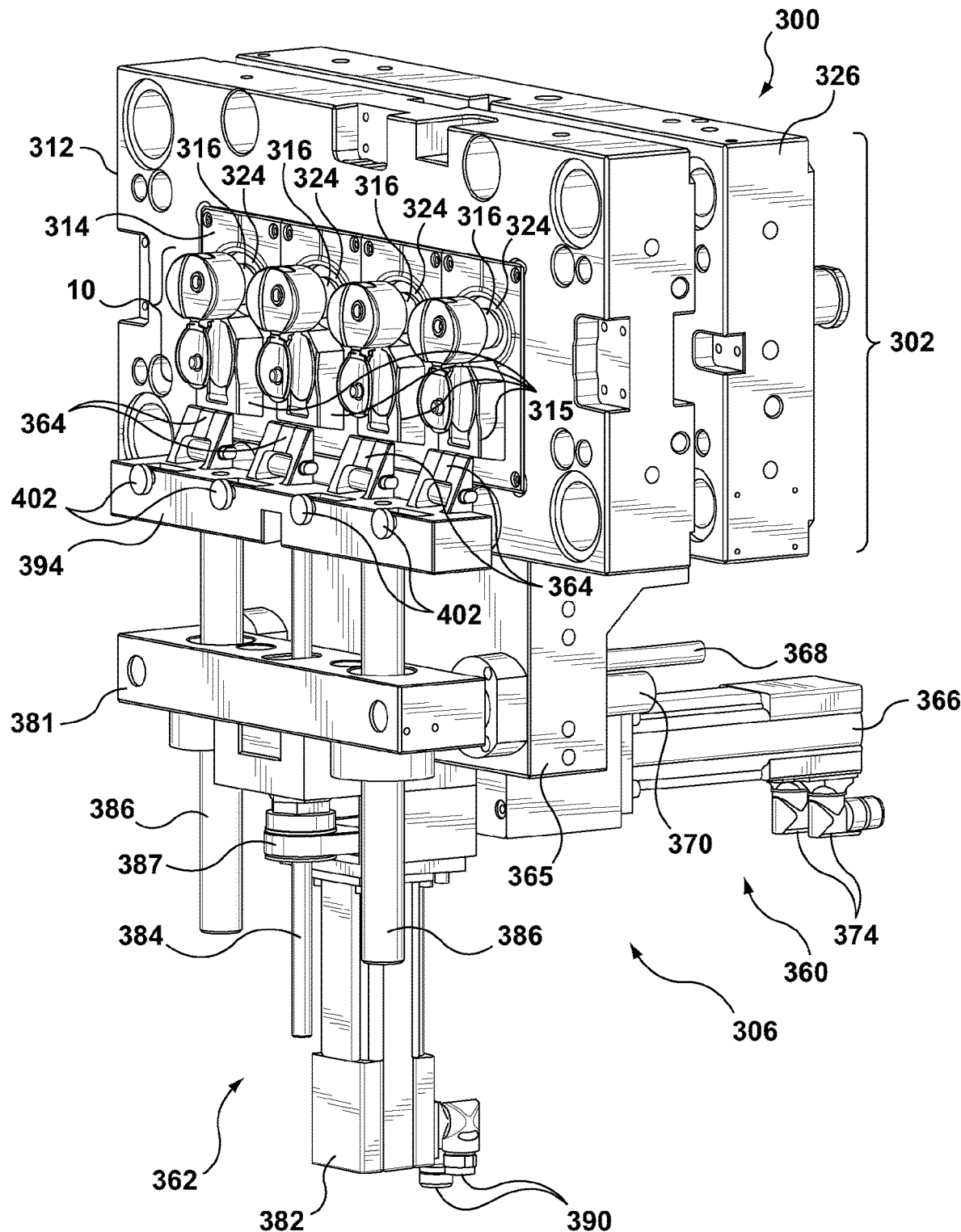
Figure 10:
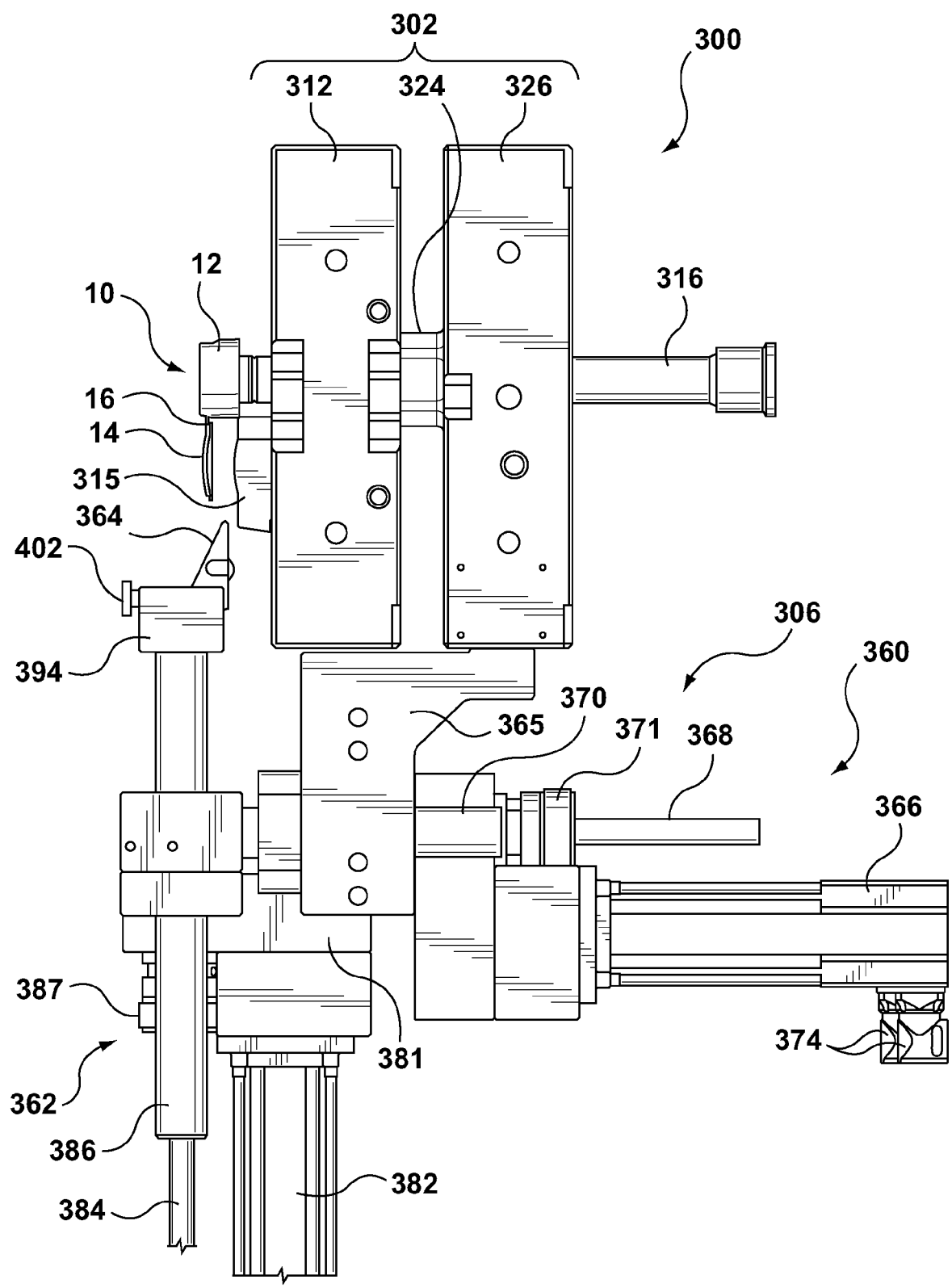
Figure 11:
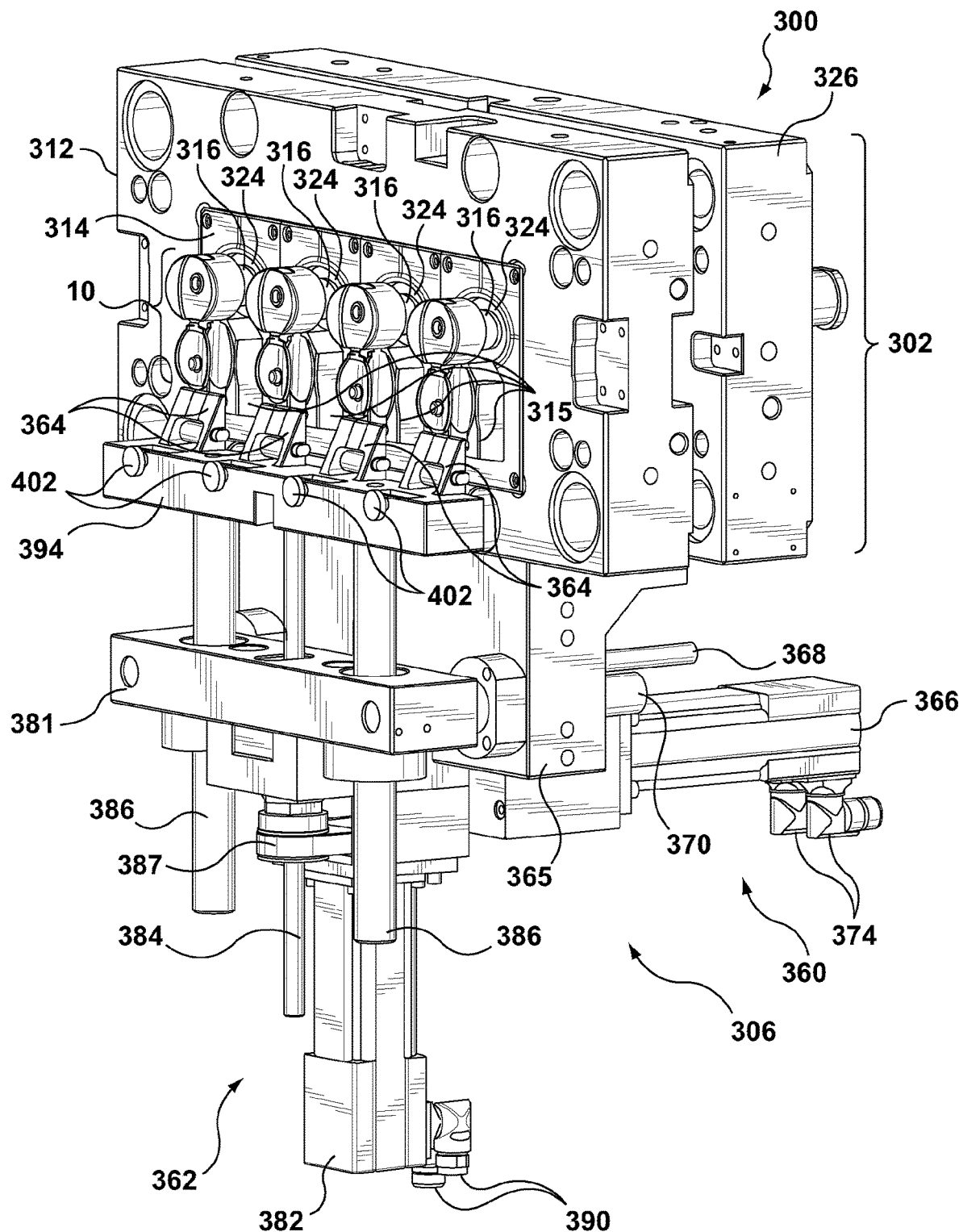
Figure 12:
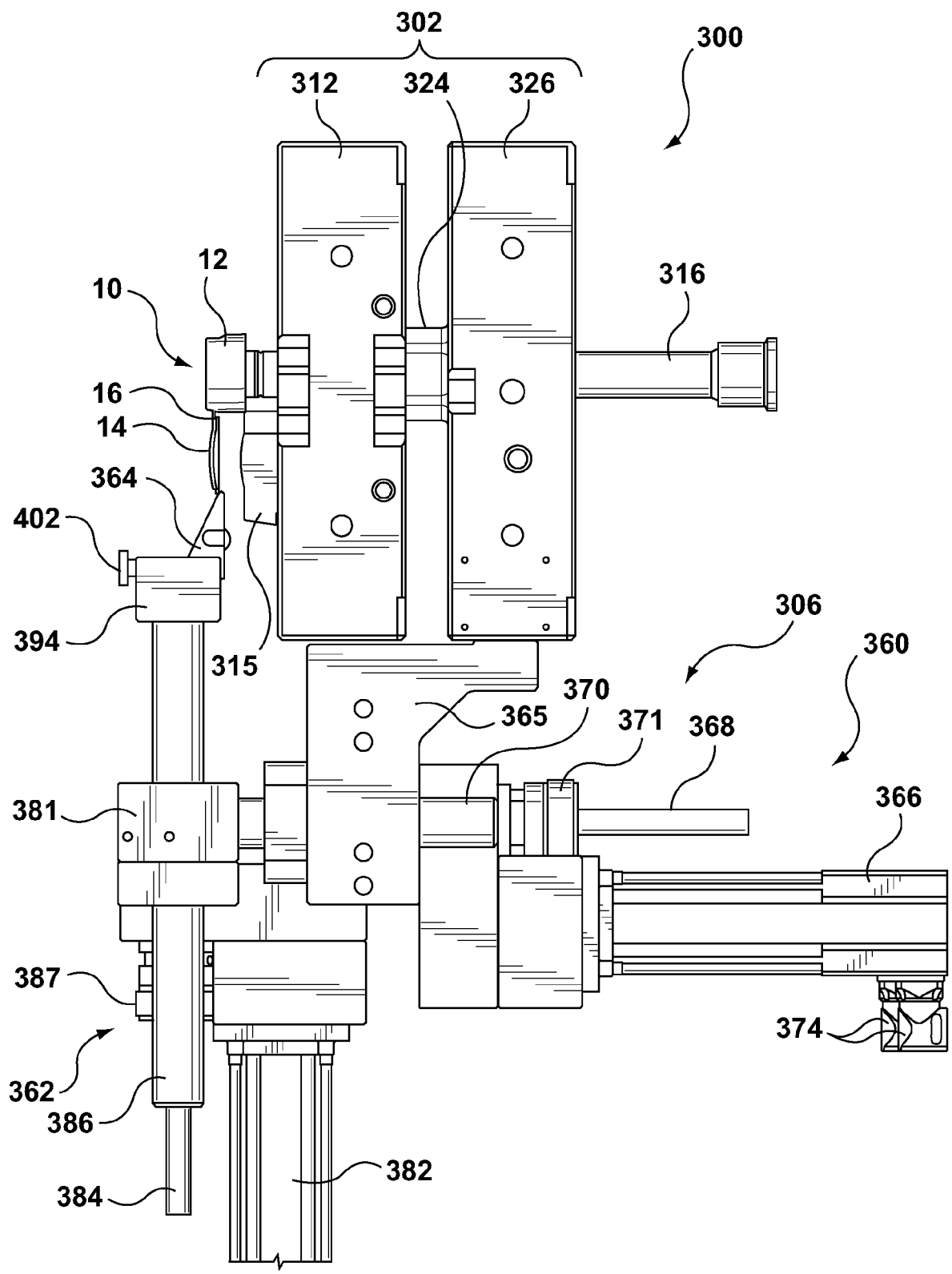
Figure 13:
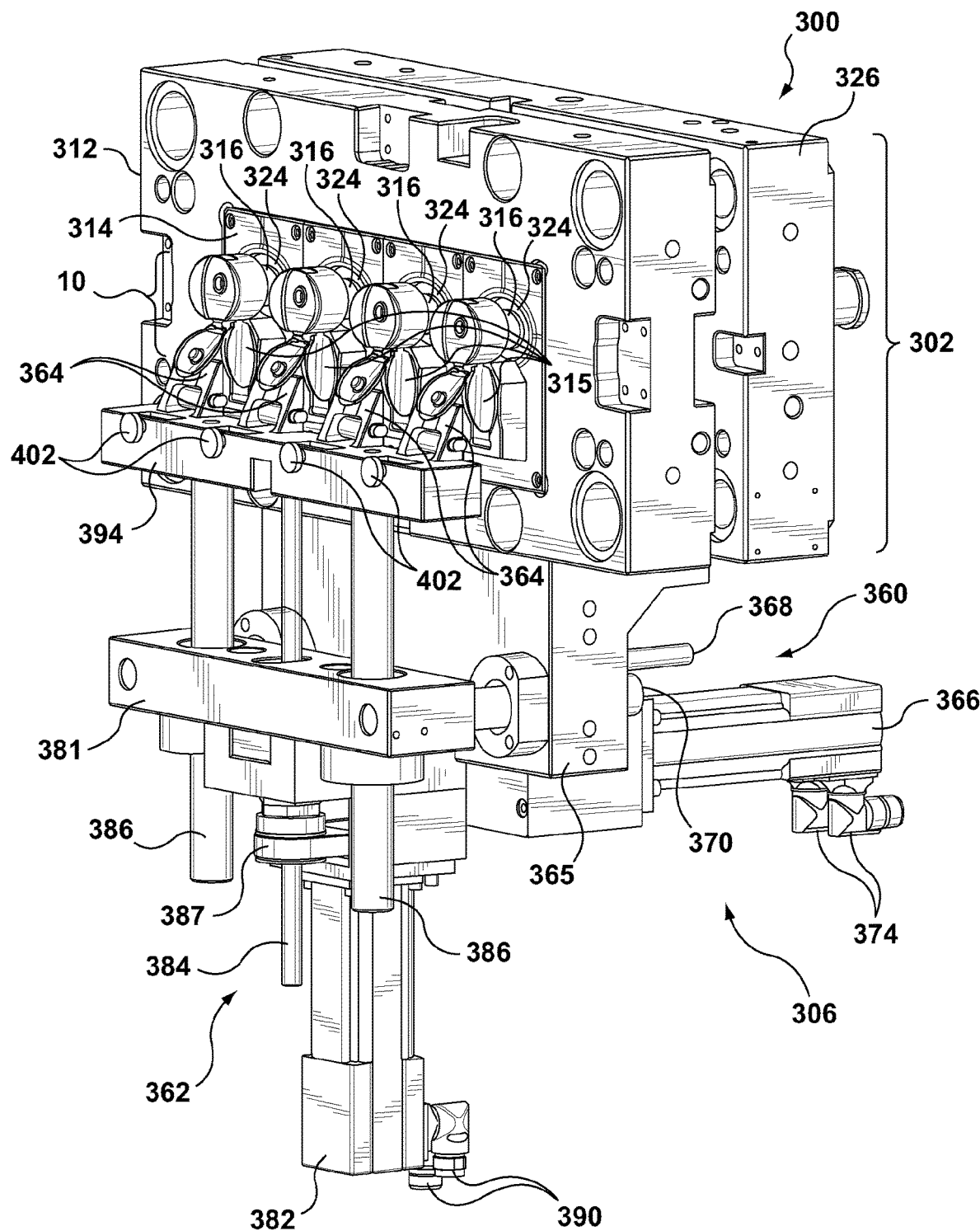
Figure 14:
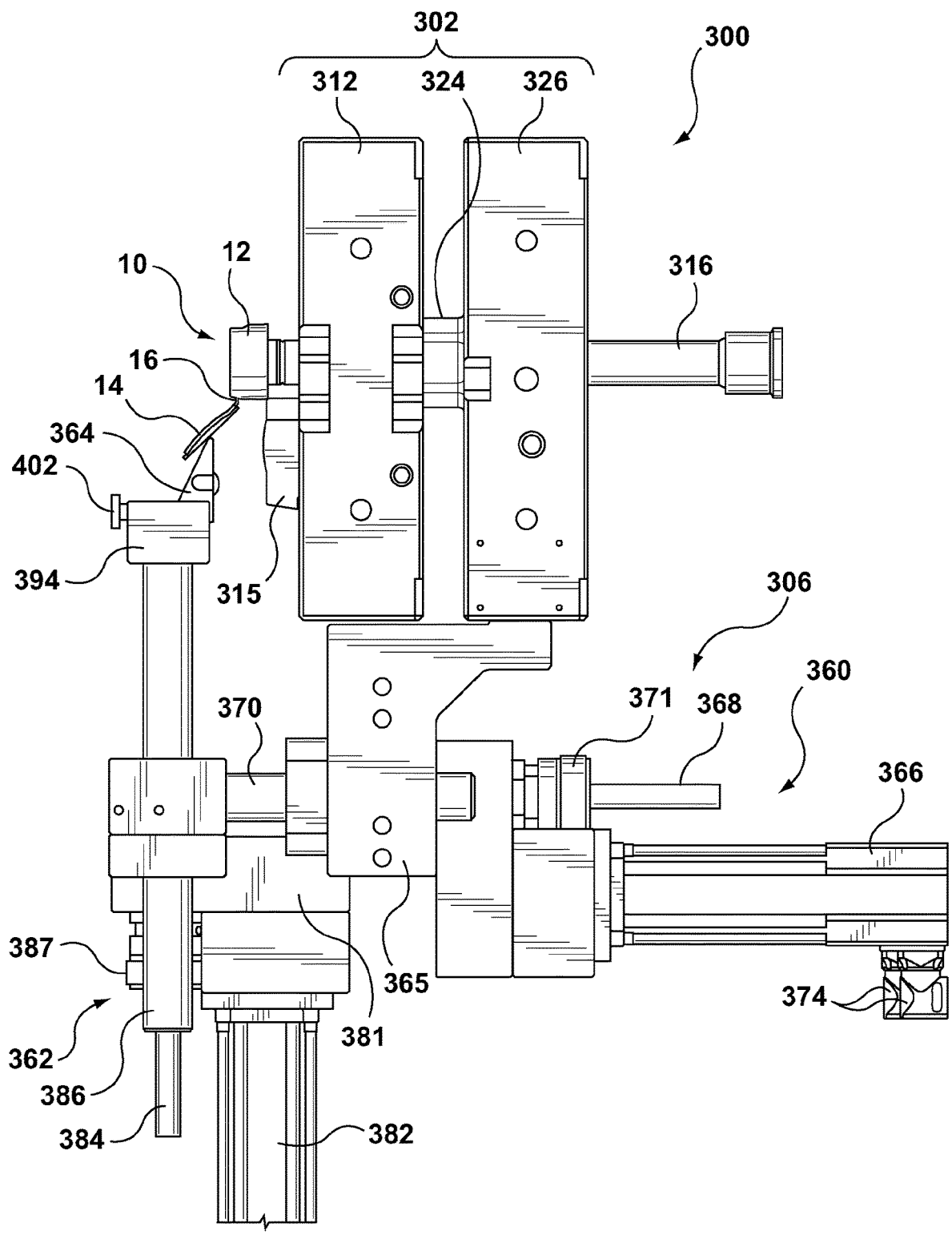

The in-mold lid closing device 306 has a horizontal linear actuator 360, a vertical linear actuator 362 and four lid closing tools 364. The horizontal linear actuator 360 is an electrical actuator including a support 365, a servomotor 366 connected to the support 365, a ball screw 368 connected to the support 365, and two shafts 370 (only one of which is shown) extending through the support 365. The servomotor 366 is controlled to turn the ball screw 368 via a belt 371, which in turn causes the screw of the ball screw 368 and the shafts 370 to move about a horizontal axis 372 (FIG. 8). The servomotor 366 has a pair of angled fittings 374. One of the angled fittings 374 receives the wires connecting the servomotor 366 to a power source 376 (FIG. 8). The other of the angled fittings 374 receives the wires connecting the servomotor 366 to a controller 378 (FIG. 8). The horizontal linear actuator 360 is fastened to the stripper plate 326 via the support 365. In the present implementation, the support 365 is made of multiple parts. It is contemplated that the support 365 could have more or less parts than illustrated. The vertical linear actuator 362 is an electrical actuator including a support 381, servomotor 382 connected to the support 381, a ball screw 184 connected to the support 381 and two shafts 386 extending through the support 381. The servomotor 382 is controlled to turn the ball screw 384 via a belt 387, which in turn causes the screw of the ball screw 384 and the shafts 386 to move about a vertical axis 388 (FIG. 8). The servomotor 382 has a pair of angled fittings 390. One of the angled fittings 390 receives the wires connecting the servomotor 382 to the power source 376. The other of the angled fittings 390 receives the wires connecting the servomotor 382 to the controller 378. The vertical linear actuator 362 is fastened to the ball screw 368 and the shafts 370 of the horizontal linear actuator 360 by via the support 381. As a result, when the servomotor 366 causes the ball screw 368 to move about the horizontal axis 372, the vertical linear actuator 362 also moves about the horizontal axis 372. In the present implementation, the support 381 is made of multiple parts. It is contemplated that the support 381 could have more or less parts than illustrated.

It is contemplated that the servomotors 366, 382 could be replaced by electric motors that are not provided with feedback sensors and that separate sensors could be used to sense the positions of the shafts 370, 386 along their respective axes 372, 388. It is also contemplated that the ball screws 368, 384 could be replaced by other mechanisms for converting rotary motion to linear motion, such as, for example, rack and pinion assemblies. It is also contemplated the horizontal linear actuator 360 and the vertical linear actuator 362 could be of a type other than electrical. For example, the horizontal linear actuator 360 and the vertical linear actuator 362 could be pneumatic or hydraulic actuators. It is also contemplated that the linear actuator 360 and the linear actuator 362 could be arranged such that the axis 372 is not horizontal, the axis 388 is not vertical and/or that the axes 372, 388 are not perpendicular to each other. It is also contemplated that the vertical linear actuator 362 could not be connected to the horizontal linear actuator 360. It is also contemplated that instead of being connected to the mold portion 302, the in-mold lid closing device 106 could be connected to the other mold portion or to a portion of the injection molding machine.

The lid closing tools 364 are connected to the shafts 386 and the ball screw 384 of the vertical linear actuator 362 by a tool mounting bar 394. Each lid closing tool 364 has a base (not shown) from which a wedge-shaped body 398 extends and a roller 400 disposed in an aperture in the body 398. Note that the bodies 398 and the rollers 400 have only been labelled in FIGS. 7 and 8 for clarity. The rollers 400 can rotate relative to the bodies 398. It is contemplated that the rollers 400 could be replaced by shafts that are fixed to the bodies 398. It is also contemplated that the lid closing tools 364 could have a different configuration. For example, the lid closing tools 364 could be like the lid closing tool 164 described above or be an eccentric member. The bases of the lid closing tools 364 are mounted to the tool mounting bar 394 by fasteners 402. By using the tool mounting bar 394 and the fastener 402, the lid closing tools 364 can be easily replaced by other lid closing tools 364 or by another type of lid closing tools suitable for closing the type of flip-top closure being molded in the injection mold 300 should the injection mold 300 be used for molding flip-top closures other than the flip-top closures 10.

By being connected to the ball screw 384 of the vertical linear actuator 362, the lid closing tools 364 are moved about the horizontal axis 372 and the vertical axis 388 by the horizontal linear actuator 360 and the vertical linear actuator 362. The controller 378 controls the actuation of the servomotors 366, 382 to move the lid closing tools 364 along a lid closing path 404 (shown in dotted lines in FIG. 20) to close the lids 14 of the flip-top closures 10 on the body portions 12 of the flip-top closures 10 as will be described below. The controller 378 also controls the actuation of the servomotors 366, 382 to control and adjust the velocity of the lid closing tools 364 along the lid closing path 404 and to control and adjust the force applied by the lid closing tools 364.

The molding cycle begins in a manner similar to that of the molding cycle using the injection mold 100, as such the beginning of the molding cycle using the injection mold 300 will not be described in detail herein. The molding cycle begins by putting the injection mold 300 in a mold closed configuration. Molding material is the injected into the molding cavities to fill the molding cavities. Thereafter, the process of cooling and holding commences. When the flip-top closures 10 have been sufficiently cooled to a temperature that is substantially safe for defect-free ejection, the injection mold 300 is opened. As the injection mold 300 is being opened, ejectors (not shown) may be actuated to ensure that the flip-top closures 10 are held on the mold portion 302.

Once the injection mold 300 has been opened, an actuator (not shown) moves the core insert plate toward the left (with respect to the orientation of FIG. 8). As a result the core inserts 316 move toward the left with the core insert plate. As a result of the movement of the core inserts 316, the flip-top closures 10 are moved to the position shown in FIGS. 7 and 8, where the lids 14 are lifted off of the mold insert 314 and the body potions 12 are still held on the core inserts 316. As can be seen in FIG. 8, the lids 14 are not in contact with any surface of the mold portion 302.

Figure 7:
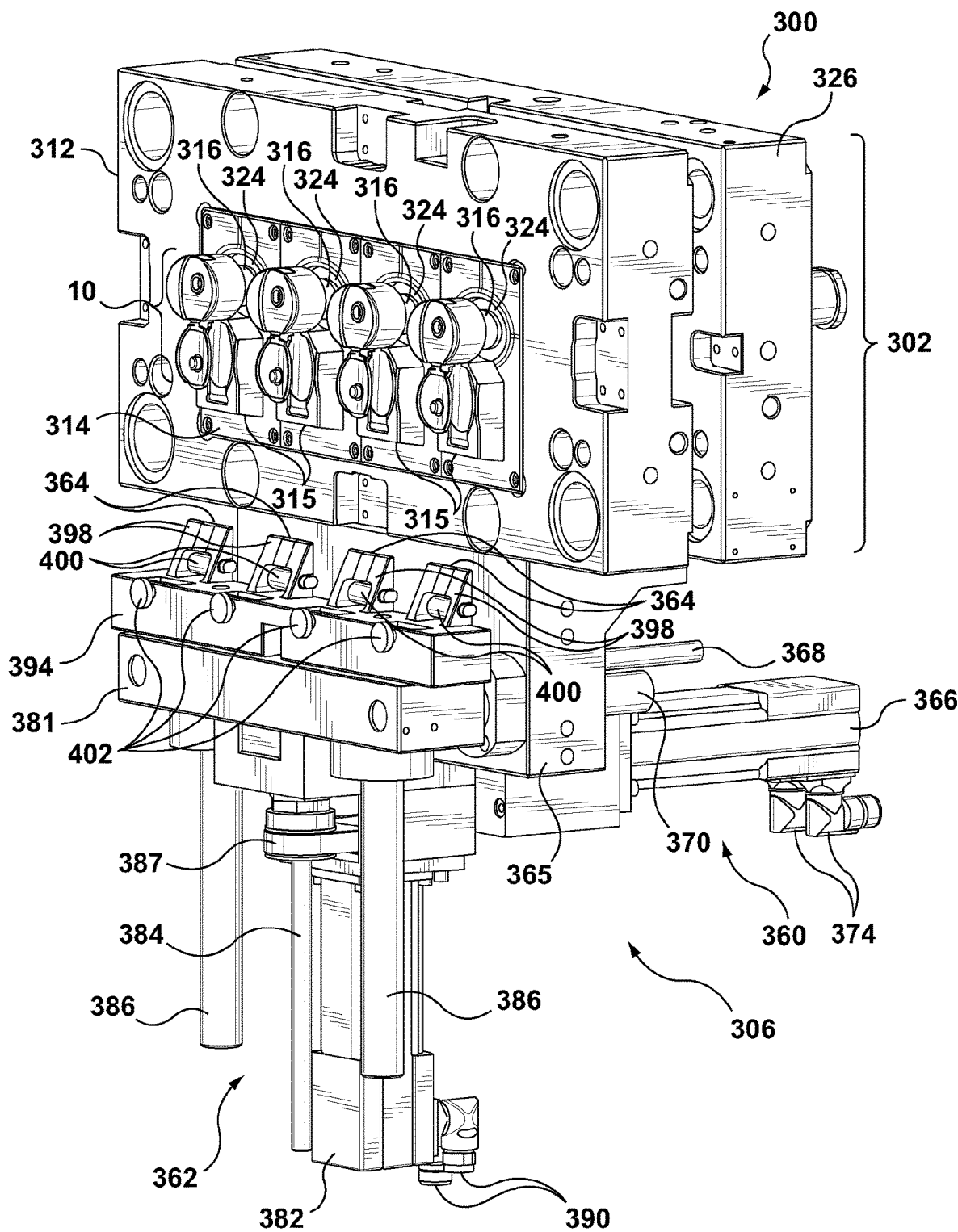
FIGS. 7 to 20 are perspective and side views of an injection mold having a lid closing device and of flip-top closures molded using the injection mold illustrating steps for closing the lids of the flip-top closures using the lid closing device.
Figure 15:
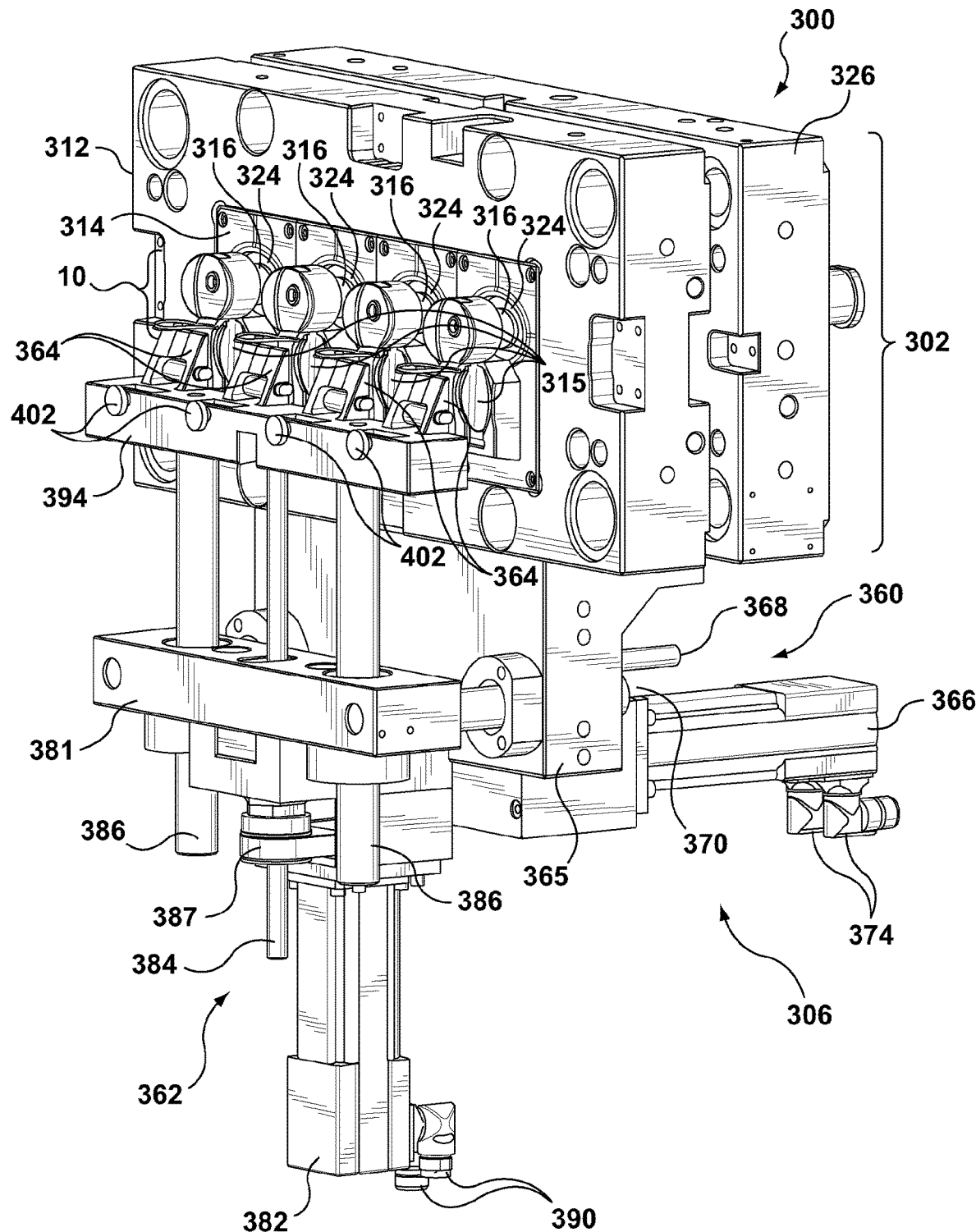
Figure 16:
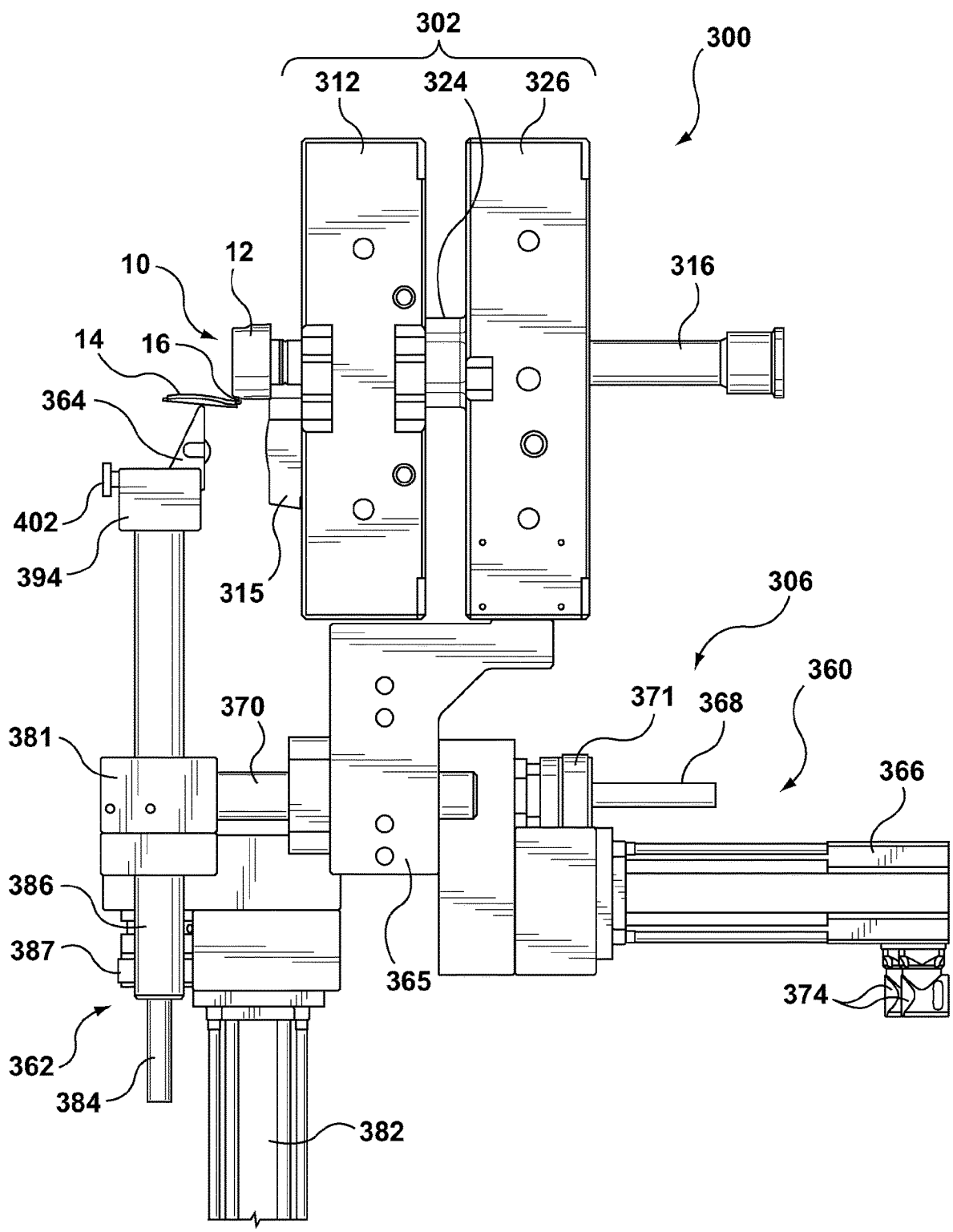
Figure 17:
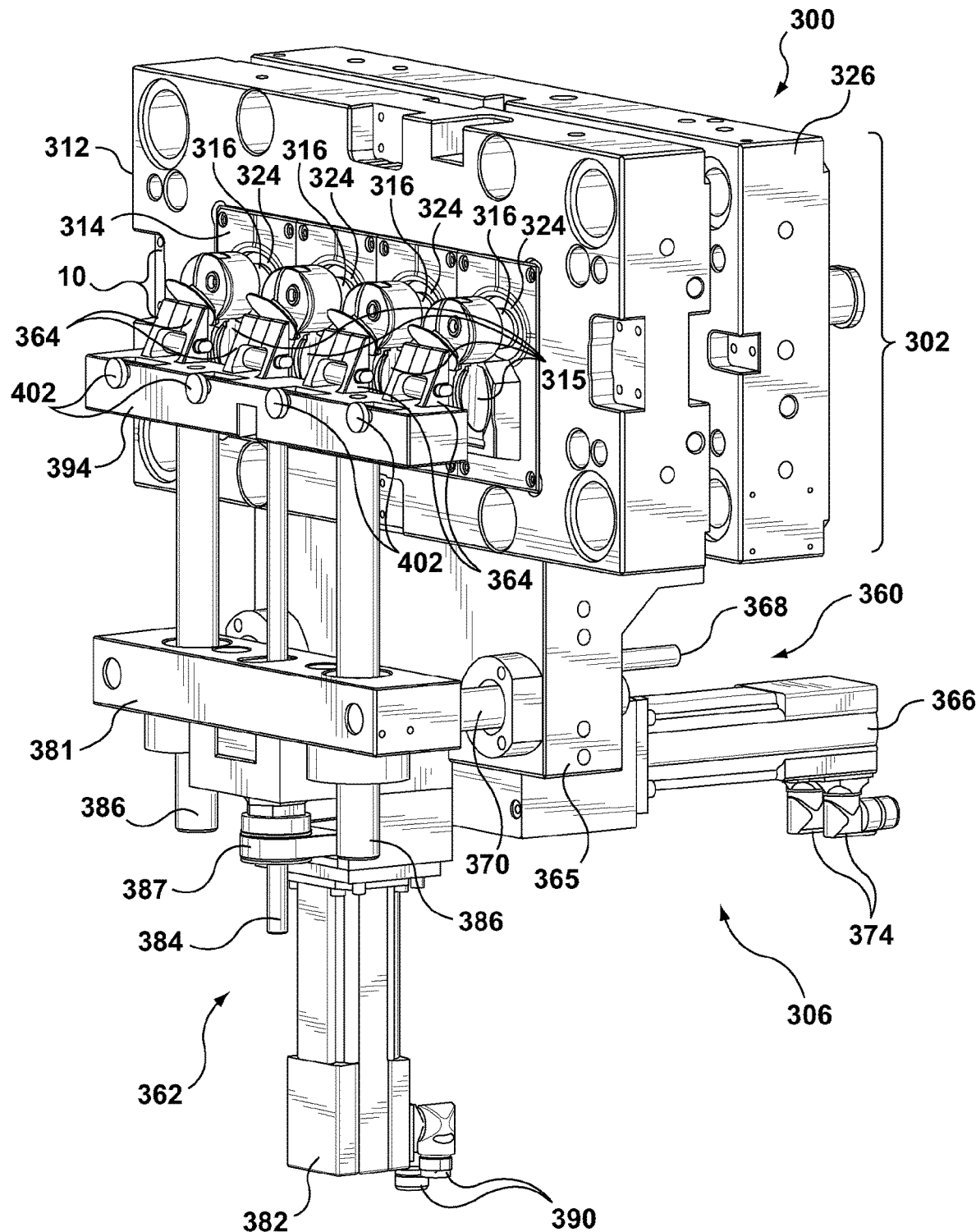
Figure 18:
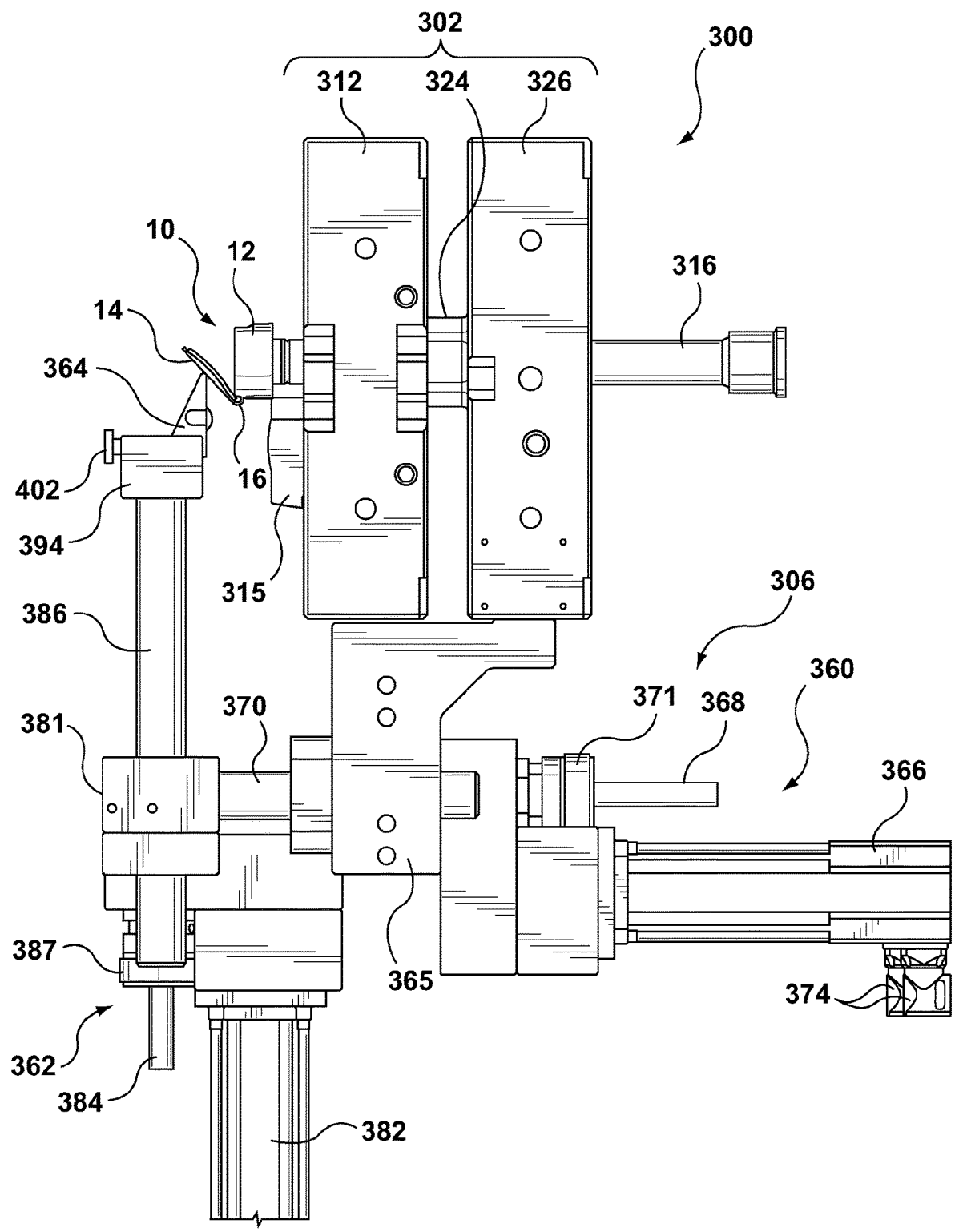
Figure 19:
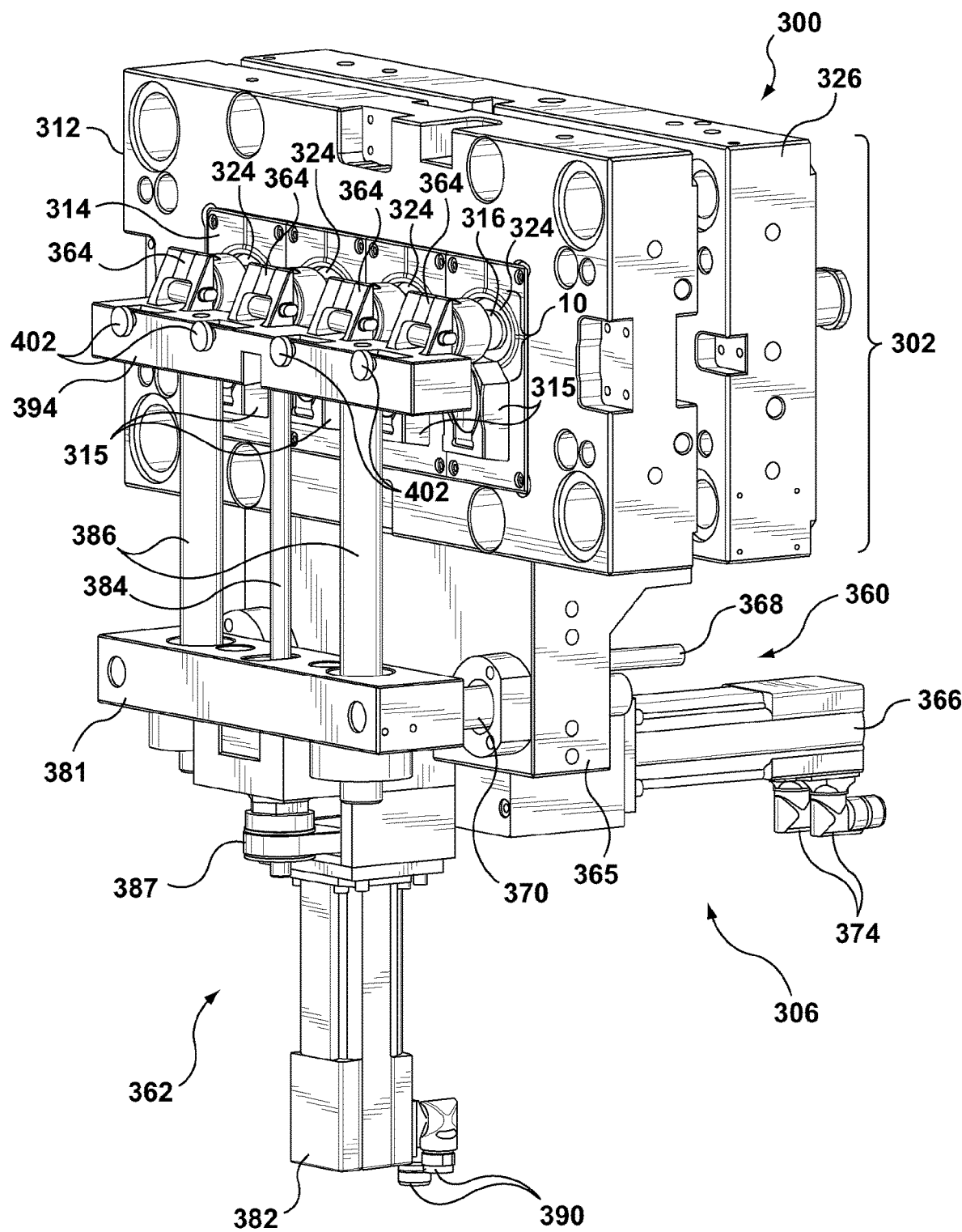
Figure 20:
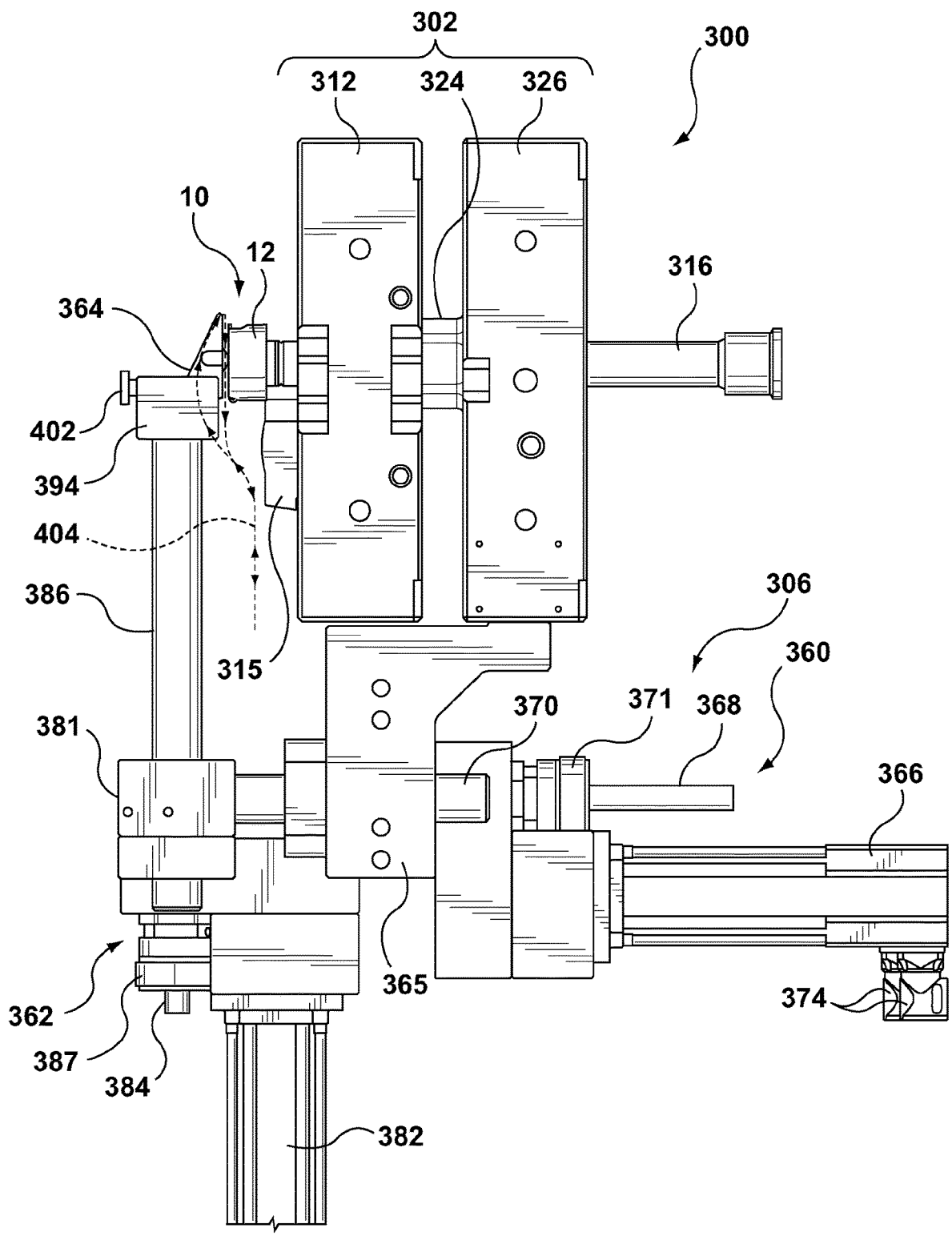

Once the injection mold 300 is in the configuration shown in FIGS. 7 and 8, the in-mold lid closing device 306 is actuated to move the lid closing tools 364 along the lid closing path 404 shown in FIG. 20. The movement of the lid closing tools 364 will be described below with respect to the orientation of FIGS. 8, 10, 12, 14, 16, 18 and 20. It should be understood that the directions and relative spatial position of the components provided would differ should the elements of the figure be oriented differently. As would be understood from comparing FIGS. 7 and 8 to FIGS. 9 and 10, the vertical linear actuator 362 is first actuated by the controller 378 to move the lid closing tools 364 up about the vertical axis 388 toward the core inserts 316. Then, as would be understood from comparing FIGS. 9 and 10 to FIGS. 11 and 12, as the vertical linear actuator 362 continues to move the lid closing tools 364 up, the controller 378 then actuates the horizontal linear actuator 360 to move the lid closing tools 364 toward the left such that the tips of the wedge-shaped bodies 398 of the lid closing tools 364 come into contact with the lower right portion of the lids 14. The controller 378 then continues to actuate the linear actuators 360, 362 to move the lid closing tools 364 up and to the left about both axes 372, 388 along a curved portion of the lid closing path 404 (starting at the position shown in FIGS. 11 and 12, continuing to the position shown in FIGS. 13 and 14 and then FIGS. 15 and 16), thereby pivoting the lids 14 toward the body portions 12 of the flip-top closures 10. Once the lids 14 are generally horizontal as shown in FIGS. 15 and 16, the controller 378 actuates the linear actuators 360, 362 to move the lid closing tools 364 up and to the right along a curved portion of the lid closing path 404 (starting at the position shown in FIGS. 15 and 16, continuing to the position shown in FIGS. 17 and 18 and then FIGS. 19 and 20), thereby pivoting the lids 14 toward the body portions 12 of the flip-top closures 10 until the lids 14 are closed as shown in FIGS. 19 and 20. As can be seen by comparing FIGS. 11 to 20, the positions at which the lid closing tools 364 make contact with the flip-top closures 10 vary as the lid closing tools 364 move along the lid closing path 404. As can also be seen by comparing FIGS. 11 to 18 to FIGS. 19 and 20, while the lids 14 are being closed (i.e. FIGS. 11 to 18), the lids 14 are in contact with the wedge-shaped bodies 398 of the lid closing tools 364, and once the lids 14 are closed on the body portions 12 (FIGS. 19 and 20), the lids are in contact with the rollers 400 of the lid closing tools 364. Once the lids 14 are closed, the controller 378 actuates the vertical linear actuator 362 to move the lid closing tools 364 down. As the lid closing tools 364 move down, the rollers 400 roll over the surfaces of the lids 14. It is contemplated that as the rollers 400 roll over the surfaces of the lids 14, the controller 378 could actuate the horizontal linear actuator 360 such that the rollers 400 apply forces toward the right on the lids 14 to ensure that the lids 14 are properly closed. Once the lid closing tools 364 have cleared the flip-top closures 10, the controller 378 actuates the linear actuators 360, 362 to first move the lid closing tools 364 down and right along a curved portion of the lid closing path 404 and then only down about the axis 388 until the lid closing tools 364 are returned to their initial positions (i.e. as seen in FIGS. 7 and 8).

In one implementation, the controller 378 controls the actuation of the linear actuators 360, 362 such that the speed of the lid closing tools 364 varies along the lid closing path 404. For example, the lid closing tools 364 could be moved faster by the linear actuators 360, 362 when the lid closing tools 364 are not in contact with the lids 14 then when the lid closing tools 164 are in contact with the lids 14. In another implementation, the controller 378 controls the actuation of the linear actuators 360, 362 such that the speed of the lid closing tools 364 remains constant along the lid closing path 404. In one implementation, the controller 378 controls the actuation of the linear actuators 360, 362 such that the forces applied by the lid closing tools 364 vary along the lid closing path 404. For example, the lid closing tools 364 could be controlled by the linear actuators 360, 362 to apply more force when the lid closing tool 364 is about to close the lids 14 onto the body portions 12 and to then apply less forces once the lid 14 are closed. In another implementation, the controller 378 controls the actuation of the linear actuators 360, 362 such that the forces applied by the lid closing tools 164 remain constant along the lid closing path 404. It is contemplated that the lid closing path 404 could differ from the one illustrated. Two factors which determine the shape of the lid closing path 404 include, but are not limited to, the geometry of the flip-top closures 10 and the geometry of the lid closing tools 364. Therefore, the use of the horizontal linear actuator 360 and vertical linear actuator 362 to move the lid closing tools 364 about the axes 372, 388 to close the lids 14 on the body portions 12 while the flip-top closures 10 are held on the mold portion 102 allows the shape of the lid closing path 404 to be changed, allows for the control and adjustment of the velocity (i.e. speed and direction) of the lid closing tools 364 and allows for the control and adjustment of the forces applied by the lid closing tools 364.

Once the lids 14 are closed and the lid closing tools 364 have been returned to their initial positions, the flip-top closures 10 are ejected from the mold portion 302. To eject the flip-top closures 10, the stripper plate 326 is moved toward the left (with respect to the orientation of FIG. 8) by an actuator (not shown) while the core inserts 316 remain stationary. As a result, the stripper rings 324 move toward the left (with respect to the orientation of FIG. 8) relative to the core inserts 316 and extends beyond the core inserts 316, which pushes the flip-top closures 10 off of the core inserts 316. As in the present implementation the injection mold 300 separates about a vertical plane, the ejected flip-top closures 10 fall out of the injection mold 300 by gravity. Once the flip-top closures 10 have been ejected from the injection mold 300, the injection mold 300 is closed in order to begin another injection cycle.

It is contemplated that the injection mold 300 could be oriented so as to separate about a horizontal plane. As would be understood, in such an implementation the linear actuator 360 would be the vertical linear actuator and the linear actuator 362 would be in the horizontal linear actuator. In such an implementation, the flip-top closures 10 remain in the injection mold 300 after they have been ejected. In order to remove the flip-top closures 10 from the injection mold 300, a part removal apparatus is provided to push the ejected flip-top closures 10 out of the injection mold 300. In alternative embodiments of the present technology, a separate part removal apparatus (not depicted) can be used for removing the flip-top closure 10 from the injection mold 300. Implementation of such part removal apparatus is known to those of skill in the art and, as such, will not be discussed here at any length. It is contemplated that the injection mold 300 could be oriented so as to separate about a plane oriented at any angle, and that depending on the angle of this plane, a mechanism for pushing the flip-top closures 10 out of the injection mold 300 may or may not be necessary.

It should be expressly understood that various technical effects mentioned throughout the description above need not be enjoyed in each and every implementation of the present technology. As such, it is anticipated that in some implementations of the present technology, only some of the above-described technical effects may be enjoyed. While in other implementations of the present technology, none of the above enumerated technical effects may be present, while other technical effects not specifically enumerated above may be enjoyed. It should be expressly understood that the above enumerated technical effects are provided for illustration purposes only, to enable those skilled in the art to better appreciate embodiments of the present technology and by no means are provided to limit the scope of the present technology or of the claims appended herein below.

Also, those skilled in the art will appreciate that even though the description that has been presented herein above uses the injection molds 100 and 300 as exemplary environments for implementing teachings presented herein, these teachings are not so limited. As such, it should be understood that these teachings are equally applicable to other types of injection molding machines and injection molds.

It is expected that those of skill in the art, having benefitted from the teachings of the present specification, will be able to implement the various components of the injection molds 100, 300. This includes, but is not limited to, selection of materials for manufacturing the various components of the injection molds 100, 300, selection of dimensions of the various components of the injection molds 100, 300, making the molding surfaces of the various components of the injection molds 100, 300, placement of cooling channels and/or heating elements within the various components of the injection molds, interfaces defined between the various components of the injection molds 100, 300 and other parts of the injection molding machine accommodating, in use, the injection mold 100 or 300 and the like.

It is noted that the foregoing has outlined some of the more pertinent non-limiting implementations. It will be clear to those skilled in the art that modifications to the disclosed non-limiting implementations can be effected without departing from the spirit and scope thereof. As such, the described non-limiting implementations ought to be considered to be merely illustrative of some of the more prominent features and applications. Other beneficial results can be realized by applying the non-limiting implementations in a different manner or modifying them in ways known to those familiar with the art. The mixing and/or matching of features, elements and/or functions between various non-limiting implementations are expressly contemplated herein as one of ordinary skill in the art would appreciate from this disclosure that features, elements and/or functions of one implementation may be incorporated into another implementation as appropriate, unless expressly described otherwise, above. Although the description is made for particular arrangements and methods, the intent and concept thereof may be suitable and applicable to other arrangements and applications.

What is claimed is:

1. An injection mold for molding a flip-top closure, the flip-top closure having a body portion and a lid attached to the body portion by a living hinge, the injection mold comprising:
   a first mold portion for defining a first portion of the flip-top closure;
   a second mold portion for defining a second portion of the flip-top closure;
   a lid closing tool for closing the lid of the flip-top closure on the body portion after a molding of the flip-top closure in the injection mold and before an ejection of the flip-top closure from the injection mold;
   a first linear actuator operatively connected to the lid closing tool for moving the lid closing tool about a first axis; and
   a second linear actuator operatively connected to the lid closing tool for moving the lid closing tool about a second axis,
   the first and second linear actuators being independently controllable to move the lid closing tool along one of a plurality of lid closing paths for closing the lid of the flip-top closure on the body portion;
   wherein a velocity of the lid closing tool and a force applied by the lid closing tool are independently controllable and adjustable by controlling the first and second linear actuators.

2. The injection mold of claim 1, wherein:
   the flip-top closure is held onto the second mold portion after the molding of the flip-top closure in the injection mold and before the ejection of the flip-top closure from the injection mold; and
   the first linear actuator is connected to the second mold portion.

3. The injection mold of claim 2, wherein:
the second linear actuator is connected to the first linear actuator;
the second linear actuator is movable about the first axis by the first linear actuator; and
the lid closing tool is movable about the first axis together with the second linear actuator.

4. The injection mold of claim 1, wherein the first axis is perpendicular to the second axis.

5. The injection mold of claim 1, wherein the lid closing path comprises at least one curved portion for pivoting the lid relative to the body portion.

6. The injection mold of claim 1, wherein the first and second linear actuators each comprise a servomotor.

7. The injection mold of claim 6, wherein the first and second linear actuators each further comprise a ball screw operatively connected to the servomotor.

8. The injection mold of claim 1, wherein:
at least one of the first and second mold portions defines a cavity; and
the lid closing tool is disposed at least in part in the cavity during the molding of the flip-top closure in the injection mold.

9. The injection mold of claim 1, wherein:
the injection mold molds a plurality of flip-top closures; and
the lid closing tool is a plurality of lid closing tools operatively connected to the first and second linear actuators.

10. The injection mold of claim 9, further comprising a tool mounting bar connected to the second linear actuator; and
wherein the plurality of lid closing tools is mounted to the tool mounting bar.

* * * * *